United States Patent
Hutzel et al.

(10) Patent No.: US 6,428,172 B1
(45) Date of Patent: Aug. 6, 2002

(54) REARVIEW MIRROR ASSEMBLY WITH UTILITY FUNCTIONS

(75) Inventors: Barry W. Hutzel; Niall R. Lynam; Darryl P. DeWind, all of Holland; John O. Lindahl, Fruitport, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/449,121

(22) Filed: Nov. 24, 1999

(51) Int. Cl.$^7$ .............................. G02B 5/08; G02F 1/15; B60Q 1/26; B60R 1/04

(52) U.S. Cl. ...................... 359/838; 359/872; 359/265; 359/267; 359/273; 359/604; 362/494; 362/191; 362/486

(58) Field of Search ................... 359/838, 871, 359/872, 265, 603, 604, 267, 273; 362/486, 494, 135, 140, 142, 183, 190, 191

(56) References Cited

U.S. PATENT DOCUMENTS

| | | | |
|---|---|---|---|
| 3,099,797 A | 7/1963 | A. Piccinini | 325/312 |
| 3,543,018 A | 11/1970 | Barcus et al. | 240/4.2 |
| 3,588,233 A | * 6/1971 | Lambert | |
| 4,247,850 A | 1/1981 | Marcus | 340/694 |
| 4,436,371 A | 3/1984 | Wood et al. | 350/281 |
| 4,443,057 A | 4/1984 | Bauer et al. | 350/281 |
| 4,447,808 A | 5/1984 | Marcus | 340/696 |
| 4,524,941 A | 6/1985 | Wood et al. | 248/544 |
| 4,646,210 A | 2/1987 | Skogler et al. | 362/142 |
| D289,989 S | 5/1987 | Skogler et al. | D12/188 |

(List continued on next page.)

FOREIGN PATENT DOCUMENTS

| | | |
|---|---|---|
| DE | 2332885 | 1/1975 |
| DE | 3605704 A1 | 8/1987 |
| EP | 0381016 A1 | 8/1990 |
| FR | 1571768 | 6/1969 |
| GB | 2004418 A | 3/1979 |
| GB | 2192370 A | 1/1988 |
| GB | 2297632 A | 8/1996 |
| JP | 58180347 | 10/1983 |
| JP | 3231044 | 10/1991 |
| WO | WO 8202448 | 7/1982 |

OTHER PUBLICATIONS

U. S. application No. 08/918,772, filed Aug. 25, 1997, entitled Modular Rearview Mirror Assembly, pending.

U. S. application No. 09/133,343, filed Aug. 13, 1998, entitled Rearview Mirror with Lighting Assembly, pending.

U.S. application No. 09/371,871, filed Aug. 5, 1999, entitled Lighted Vehiculer Mirror Assembly, pending.

*Primary Examiner*—Ricky D. Shafer
(74) *Attorney, Agent, or Firm*—Van Dyke, Garnder, Linn & Burkhart, LLP

(57) ABSTRACT

An interior rearview mirror assembly for a vehicle includes a reflective element, a housing or casing supporting the reflective element, and the casing including a storage space. The storage space provides storage for at least one accessory and for storing the accessory in the location easily accessible by an occupant of the vehicle whereby the accessory can be inserted into and removed from the storage space for use by an occupant of the vehicle. The storage space may take the form of a recess provided in a top wall of the casing, a recessed portion provided in a front wall, back wall, or end wall of the casing. In one form, the recessed portion houses a pendent accessory which is movable between a retracted position within the recess to an extended position for viewing by an occupant of the vehicle. For example, the pendent accessory may include a reflective element or a display element, for displaying information to an occupant of the vehicle.

17 Claims, 20 Drawing Sheets

U.S. PATENT DOCUMENTS

| | | | |
|---|---|---|---|
| 4,733,336 A | 3/1988 | Skogler et al. | 362/142 |
| 4,768,870 A | 9/1988 | Chen | 350/631 |
| D299,491 S | 1/1989 | Masuda | D12/188 |
| 4,807,096 A | 2/1989 | Skogler et al. | 362/142 |
| D304,920 S | 12/1989 | Schifrin | D12/188 |
| 4,974,129 A * | 11/1990 | Grieb et al. | 362/183 |
| 5,059,015 A * | 10/1991 | Tran | 359/871 |
| 5,077,643 A * | 12/1991 | Leach | 362/183 |
| 5,124,845 A * | 6/1992 | Shimojo | 359/838 |
| 5,140,455 A | 8/1992 | Varaprasad et al. | 359/265 |
| 5,178,448 A | 1/1993 | Adams et al. | 362/83.1 |
| 5,253,109 A * | 10/1993 | O'Farrell et al. | 359/604 |
| 5,285,060 A | 2/1994 | Larson et al. | 250/214 |
| D351,370 S | 10/1994 | Lawlor et al. | D12/187 |
| 5,479,155 A | 12/1995 | Zeinstra et al. | 340/825.22 |
| 5,530,240 A | 6/1996 | Larson et al. | 250/214 |
| 5,550,677 A * | 8/1996 | Schofield et al. | 359/604 |
| 5,566,244 A | 10/1996 | ul Azam et al. | 379/58 |
| 5,572,354 A | 11/1996 | Desmond et al. | 359/265 |
| 5,576,687 A | 11/1996 | Blank et al. | 340/438 |
| 5,615,857 A | 4/1997 | Hook | 248/549 |
| 5,649,317 A * | 7/1997 | Suzuki | |
| 5,649,756 A | 7/1997 | Adams et al. | 362/83.1 |
| 5,669,698 A | 9/1997 | Veldman et al. | 362/83.1 |
| 5,671,996 A | 9/1997 | Bos et al. | 362/83.1 |
| 5,673,994 A | 10/1997 | Fant, Jr. et al. | 362/831 |
| 5,708,410 A | 1/1998 | Blank et al. | 340/438 |
| D390,524 S | 2/1998 | DeLine et al. | D12/187 |
| 5,719,714 A * | 2/1998 | Ackeret | 359/871 |
| 5,812,321 A | 9/1998 | Schierbeek et al. | 359/601 |
| 5,813,745 A | 9/1998 | Fant, Jr. et al. | 362/83.1 |
| 5,820,245 A | 10/1998 | Desmond et al. | 362/83.1 |
| D400,481 S | 11/1998 | Stephens et al. | D12/187 |
| 5,878,353 A | 3/1999 | ul Azam et al. | 455/550 |
| 5,938,321 A | 8/1999 | Bos et al. | 362/494 |
| 5,940,503 A | 8/1999 | Palett et al. | 379/454 |
| 6,000,823 A | 12/1999 | Desmond | 362/494 |
| 6,026,162 A | 2/2000 | Palett et al. | 379/454 |
| 6,049,271 A * | 4/2000 | Chu | 362/494 |
| 6,079,858 A * | 6/2000 | Hicks | 362/494 |

* cited by examiner

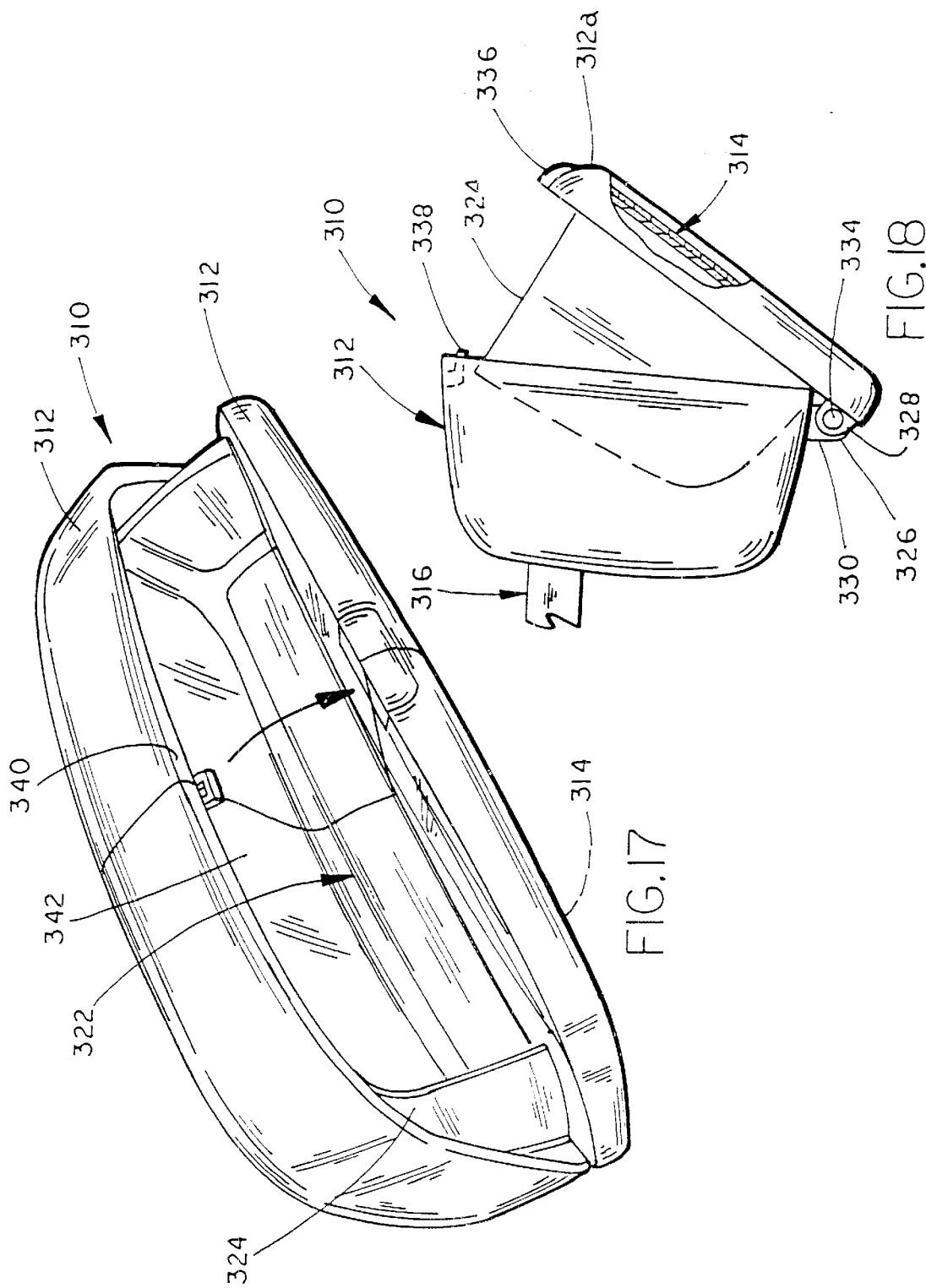

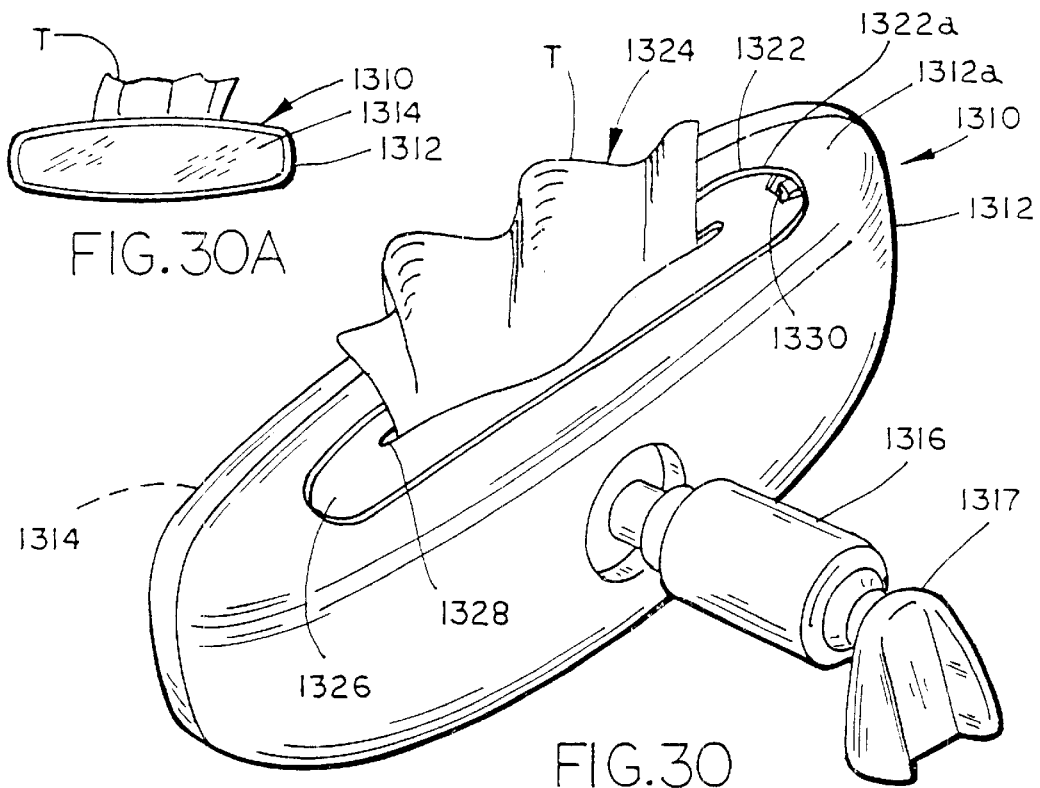
FIG. 30A
FIG. 30
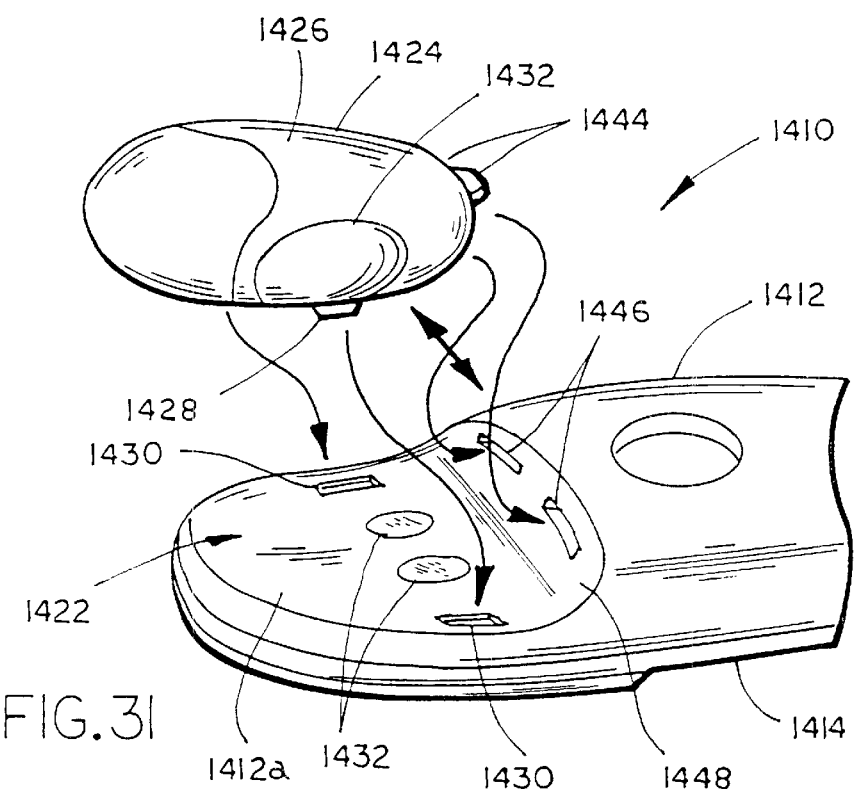
FIG. 31

REARVIEW MIRROR ASSEMBLY WITH UTILITY FUNCTIONS

TECHNICAL FIELD AND BACKGROUND OF THE INVENTION

The present invention relates to a rearview assembly and, more specifically to an interior rearview mirror assembly for use in vehicles incorporating utility functions, such as storage space for holding or housing various accessories.

Until recently, rearview mirror assemblies have been used primarily for rear vision. More recently, electronic, electric and various additional functional features, however, have been added to the rearview mirror assembly, for example map reading lights, reflective elements with displays, controls for actuating garage doors, or the like.

With the advent of electro-optic mirrors such as electrochromic mirrors, a new generation of rearview mirrors has afforded the possibility of a slim reflector package. As a day/night actuator mechanism is no longer needed in such mirrors, the size of the reflective element assembly is defined be the thickness of the electrochromic mirror element and by its associated electronics.

In addition, more recently, drivers and occupants of the vehicle engage in more and more non-driving activities, such as telephone conversations, note taking, remote transactions, and the like. As a result, many of these activities take the driver's attention away from the front of the vehicle because the activity involves the driver looking to locations in the vehicle remote from the windshield. Furthermore, while note pad holders have been devised to attach to the windshield, by suction cups or the like, these holders often hamper or obstruct the view through the windshield and may come loose or detach. As a result, the driver of the vehicle may have an obstructed view. Also, frequently a driver or vehicle occupant may remove eyeglasses or sunglasses or the like when exiting the vehicle, and seeks a storage place where they can be left and readily found.

Consequently, there is a need to optimize the available space in the vehicle for storing and locating objects and accessories, such as sunglasses, flashlights, map holders, writing surfaces, pen holders and the like, and, furthermore, providing accessories in a location that is easy to reach but which does not cause the driver of the vehicle to redirect his or her eyes far from the front of the vehicle, thus minimizing or eliminating the driver's distraction. In addition, it is desirable that the space which is used to store or locate these objects and accessories does not obstruct the driver's view.

SUMMARY OF THE INVENTION

The present invention provides an interior rearview mirror assembly, which includes a mount for attachment of the assembly to a windshield or to a header portion of the vehicle interior, and one or more storage spaces for storing, locating or holding objects and/or accessories.

In one form of the invention, an interior rearview mirror assembly includes a casing or housing, a reflective element positioned in the casing, and the casing including a storage space. The storage space provides storage for at least one accessory and for storing the accessory in a location which is easily accessible by an occupant of the vehicle.

In one aspect, the storage space is defined by a recess or pocket provided on or in the casing, for example a recess or pocket provided in an upper wall of the casing. The storage space may comprise a compartment or bin, such as is defined by the recess or pocket or the like. In further aspects, the storage space comprises an elongated trough-shape body for supporting an accessory, such as at least one of a pair of spectacles, a writing instrument, and coins. In other forms, the casing includes an upper wall and an opening in the upper wall. A storage bin, preferably a removable storage bin, is positioned as an insert in the opening with the insert forming the recess and providing the storage space. In another embodiment, the walls of the bin are defined by the wall of the mirror assembly casing itself, such as formed by molding.

In other forms, the casing includes a recess which extends into a bottom wall of the casing for storing a pendent accessory. For example, the pendent accessory may include a reflective element or may be a display screen, such as a liquid crystal display screen, or may be a writing pad or a keyboard. Preferably, the pendent accessory includes a housing, which supports the accessory. In further aspects, the housing is supported from the mirror assembly by a support. Preferably, the accessory housing is pivotally mounted to the support to permit repositioning of the accessory for viewing by or access to an occupant of the vehicle, such as by a driver or a passenger.

In other aspects, the pendent accessory includes a display screen, such as a touch screen, which displays information for an occupant of the vehicle. In preferred form, the pendent accessory includes a housing which supports the display screen. The housing is supported from the mirror assembly by a support, with the housing being pivotally mounted to the support to permit repositioning of the display screen. Further, the pendent accessory may include a circuit board for supporting electronics which display information on the display screen.

In other aspects, the pendent accessory is mounted for extension and retraction into the recess. Such pendent accessory may be mounted for extension and/or retraction from the casing that houses the reflective element, or from the mirror support arm that supports the mirror casing and about which the mirror casing is pivotably moveable, or from the mirror mount where the interior rearview mirror attaches to the vehicle such as to a button adhered to the windshield or to an attachment point in the header region of the roof-area of the vehicle. The pendent accessory housing includes an outer surface which generally aligns with the outer surface of the casing when the housing is moved to its retracted position within the casing.

In other aspects, the casing includes an accessory attachment member for releasably holding an accessory. For example, the accessory attachment member may comprise a clip or retainer with generally resilient or spring-like arm for receiving and releasably retaining an object such as a pen, a tool or the like. Such attachment member may comprise a generally C-shaped clip for releasably holding a work piece. Optionally, the accessory attachment member is integrally molded with the casing. For example, the accessory attachment member may be provided at the bottom wall of the casing or provided on a forward facing (relative to the direction of travel of the vehicle) wall of the casing so that, when the interior mirror assembly is mounted in the vehicle, a work piece (such as for example, a writing instrument such as a pencil or a pen or a tool or a utility instrument such as a Swiss Army knife) is held to the mirror housing at its rear, and between the outer wall of the mirror housing and the inner surface of the vehicle windshield.

In yet a further aspect, the casing includes a recess formed in a forward facing side of the casing. A dockable assembly such as a flashlight, phone, or pager is supported in the recess and is removably mounted to the casing such that an occupant of the vehicle can quickly and easily remove the dockable assembly for use independently of the rearview mirror assembly.

In further aspects, the casing includes an upper wall, a lower wall, and opposed end walls. A recess extends into one of the end walls thereby defining a storage space. The recess extends between the upper and lower walls to define a slotted recess which supports an accessory holder. The accessory holder is slidably positioned and releasably held in the recess. Preferably, the holder includes a body with upper and lower walls, an end wall, and a back wall. The end wall inserts into the recess when the holder is positioned in the recess. At least one of the upper wall, lower wall, and an edge of the back wall is aligned to follow contours of the casing when the holder is positioned in the recess.

In another form of the invention, an interior rearview mirror assembly includes a casing or reflective element supported in the casing and a support for mounting the casing to a windshield mounting button. The support preferably includes a break-away bracket or mount which includes a storage space for supporting at least one accessory thereon.

In one aspect, the bracket includes a planar mounting surface for supporting the accessory thereon. Optionally, the bracket may include an accessory attachment member for holding a work piece. In further aspects, the bracket includes a bottom edge, with the accessory attachment member being positioned at the bottom edge.

Advantages provided by the present invention include a high mounted storage location which is easily accessible to an occupant of the vehicle. In addition, by incorporating the storage space into an interior rearview mirror assembly the distraction caused by retrieval from or placement into the storage space is minimized as the effort or action to retrieve or store is equivalent to the action of adjusting the position of the rearview. Further, the location of the storage space is not readily discernible from the outside of the vehicle enhancing the security of the vehicle.

These and other objects, advantages, purposes, and features of the invention will become more apparent from the study of the following description taken in conjunction with the drawings.

BRIEF DESCRIPTION OF THE DRAWINGS

FIG. 17 is a top perspective view of a fourth embodiment of the mirror assembly of FIG. 1 illustrating a storage space within the mirror assembly housing;

FIG. 18 is a cross-sectional view taken along line XVIII—XVIII of FIG. 17;

FIG. 30 is another embodiment of the rearview mirror assembly illustrated in FIGS. 15, 15A, and 16;

FIG. 30A is a forward elevation view of the mirror assembly of FIG. 30;

FIG. 31 is a partial rear exploded perspective view of a second embodiment of the mirror assembly of FIGS. 9–14;

DESCRIPTION OF THE PREFERRED EMBODIMENTS

Figure 1:
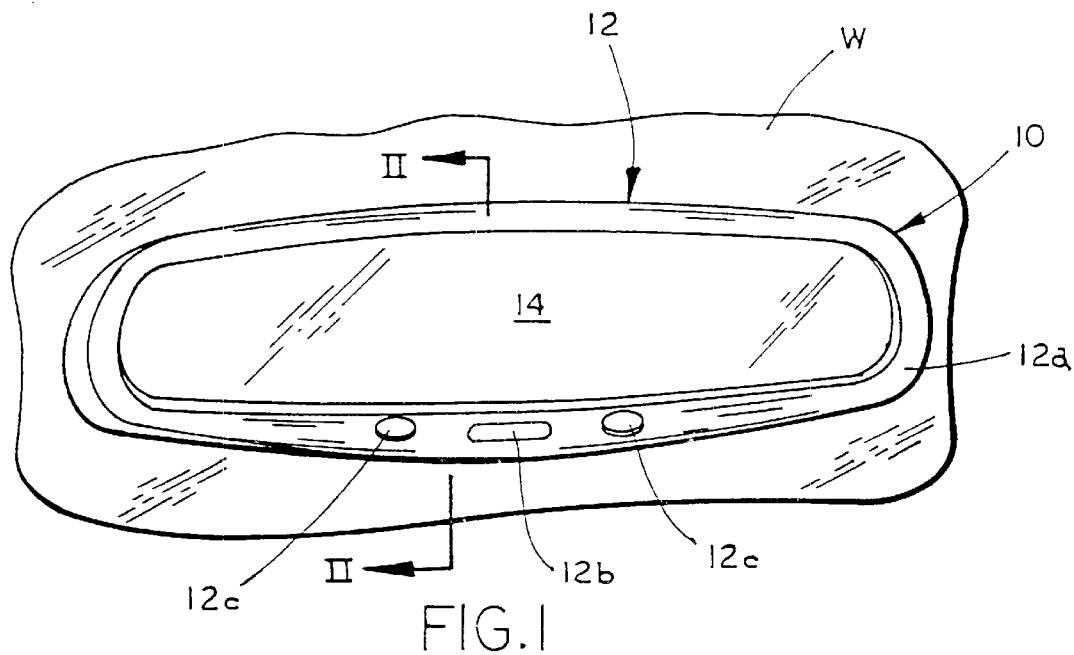
FIG. 1 is a front perspective view of the rearview mirror assembly for vehicles of the present invention showing an interior rearview mirror assembly in a viewing position in a front windshield of a vehicle.
Figure 2:
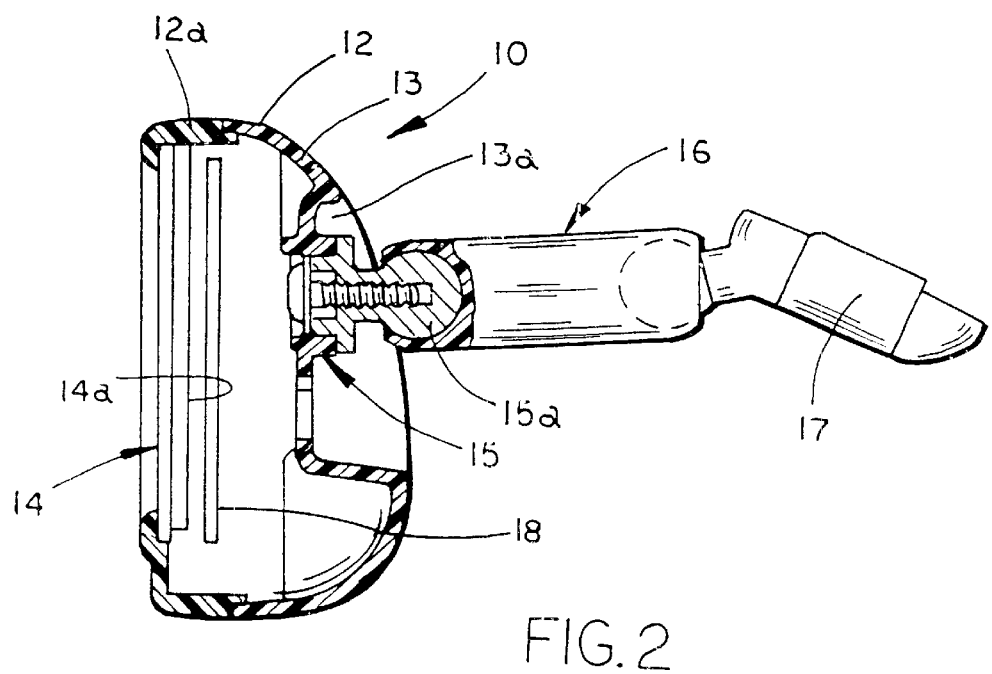
FIG. 2 is a sectional end view of the assembly of FIG. 1 taken along line II—II of FIG. 1.

Referring to FIG. 1, the numeral 10 generally designates a first embodiment of the interior rearview mirror assembly of the present invention. Assembly 10 is adapted to be releasably secured or coupled to the front windshield W of a vehicle in a conventional manner. Alternatively, assembly 10 can be adapted to secure or couple to the header portion of the vehicle above the windshield. Assembly 10 includes a mirror casing or housing 12 and a reflective element 14 which is supported in or on casing 12 in a conventional manner. Referring to FIG. 2, in the illustrated embodiment, mirror assembly 10 is mounted to windshield W by a support arm 16 and a break-away mounting bracket or mirror mount 17 which releasably mounts to a conventional mirror button on windshield W. Preferably support arm 16 is a conventional double ball type support arm which permits multi axis positioning of casing 12 about bracket 17. It should be understood that any suitable type of support arm may be employed for supporting mirror subassembly 10 within the vehicle, for example a single ball mount support or the like. In addition, break-away mounting bracket 17 may take one of several forms, such as those described and shown in U.S. Pat. Nos. 5,820,097; 5,615,857; 5,330,149; 5,100,095; or 4,936,533; the disclosures of which are incorporated by reference herein in their entireties.

Mirror casing or housing 12 is preferably molded from a resinous plastic material, such as an engineering polymer material, for example a fiber reinforced nylon plastic or an ABS plastic, or a polypropylene or other similar thermoplastic or thermoset materials. Mirror casing 12 preferably includes a front bezel 12a, which extends around a rearward facing opening 12a' (FIG. 2) of casing 12 and around a peripheral portion of reflective element 14. As used in this application, the terms rearward facing and forward facing are used to define directions relative to a vehicle when the mirror assembly is mounted in the vehicle. Rearward facing means the object is facing to the rear of the vehicle towards the driver and occupants of the vehicle. Forward facing means that it is facing forward of the vehicle towards the windshield and so is typically (but not always) not substantially visible to the driver. Bezel 12a, which is formed separately from casing 12, is preferably molded from a resinous plastic material similar to casing 12. It should be understood that casing 12 may include a retaining rim in lieu of separate bezel 12a.

Rear surface 13 of casing 12 includes a recessed area 13a in which is disposed a mounting boss 15 and ball member 15a on which support arm 16 is mounted to enable the mirror assembly 10 to be releasably secured via bracket 17 to the vehicle windshield. Alternately, casing 12 may include a socket for receiving a ball member from support arm 16. Reference is made to U.S. Pat. No. 4,930,742 for one example of a preferred break-away mounting. Another example of such a coupling is disclosed in commonly assigned U.S. Pat. No. 5,100,095 to Haan et al. An alternate method of securing support 16 is by attaching support 16 to a header, for example of the type disclosed in U.S. Pat. Nos. 5,487,522; 5,615,857; or 5,671,996; which are commonly assigned to Donnelly Corporation, and which are herein incorporated by reference in their entireties. U.S. Pat. No. 5,487,522 discloses a mirror support bracket and illustrates a bracket which can be used on either a header or windshield mounted mirror assembly. In the illustrated embodiment, a conventional mounting button is adhered to the windshield surface by a layer of conventionally known metal to glass adhesives such as polyvinyl butyral available from Monsanto Company of St. Louis, Mo. or by a silicone adhesive or the like.

Reflective element 14 preferably comprises a variable reflectance element, such as an electro-optic element. In most preferred form, reflective element 14 comprises an electrochromic mirror element, for example one of several types of electrochromic mirror elements, such as an element of the electrochemichromic type which is disclosed in U.S. Pat. No. 5,140,455, or the solid-state type such as disclosed in, for example, U.S. Pat. No. 4,712,879, U.S. Pat. No. 5,910,854, and U.S. patent application Ser. No. 08/238,521, filed Mar. 5, 1994, by Varaprassad et al. now U.S. Pat. No. 5,668,663, all commonly assigned with the present application to Donnelly Corporation of Holland, Mich., the disclosures of which are herein incorporated by reference in their entireties. Other suitable electrochromic elements are described in U.S. Pat. Nos. 5,151,816 and 5,142,40, the disclosures of which are incorporated by reference herein.

Mirror assembly 10 may house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays such as shown in U.S. Pat. No. 5,530,240 or in U.S. pending application Ser. No. 09/244,726, filed Feb. 5, 1999, and application entitled "REARVIEW MIRROR ASSEMBLY WITH ADDED FEATURE MODULAR DISPLAY" filed Nov. 24, 1999, by Timothy Skiver et al., attorney Docket No. DON01 P-702, now U.S. Pat. No. 6,329,925, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820, 245; 5,673,994; 5,649,756; or 5,178,448, microphones, such as disclosed in U.S. patent applications Ser. No. 09/361,814, filed Jul. 27, 1999, now U.S. Pat. No. 6,201,642, 09/396, 179, filed Sep. 14,1999, and now U.S. Pat. No. 6,278,377, and 09/199,907, filed Nov. 25, 1998, speakers, a compass, such as disclosed in U.S. Pat. No. 5,924,212, seat occupancy detector, a trip computer, an ONSTAR System or the like, with all of the referenced patents and applications commonly assigned to Donnelly Corporation, the disclosures of which are herein incorporated by reference in their entireties.

Referring to FIG. 2, mirror assembly 10 preferably includes a circuit board 18, which includes electronic or electrical circuitry for actuating the variable reflectance of reflective element 14 and for operating other electrical or electronic functions supported in rearview assembly 10. Circuit board 18 may support, for example, light emitting diodes (LED's) for illuminating indicia on display elements 12b, 12c or 12c' provided on chin of bezel 12a or display areas provided on reflective element 14, or map or dash board lights 540, 542 (shown in FIG. 20). Circuit board 18 may be independently supported from reflective element 14 or in casing 12 or may be mounted to reflective element's rear surface 14a on a separate plate or may be directly adhered to the rear surface by a suitable adhesive. Reference is made to U.S. Pat. Nos. 5,671,996 and 5,820,245, the disclosures of which are herein incorporated by reference in their entireties. Though the illustrated embodiment illustrates the displays and/or buttons provided at the chin of the mirror housing bezel 12a, it should be understood that one or more of these buttons or displays may be located elsewhere on the mirror assembly or separately in a module, for example of the type disclosed in U.S. patent application Ser. No. 09/244,726 entitled "REARVIEW MIRROR ASSEMBLY INCORPORATING VEHICLE INFORMATION DISPLAY", filed by Jonathon E. DeLine and Niall R. Lynam, now U.S. Pat. No. 6,172,613, which is assigned to Donnelly Corporation of Holland, Mich., the disclosure of which is herein incorporated by reference in its entirety.

Figure 3:
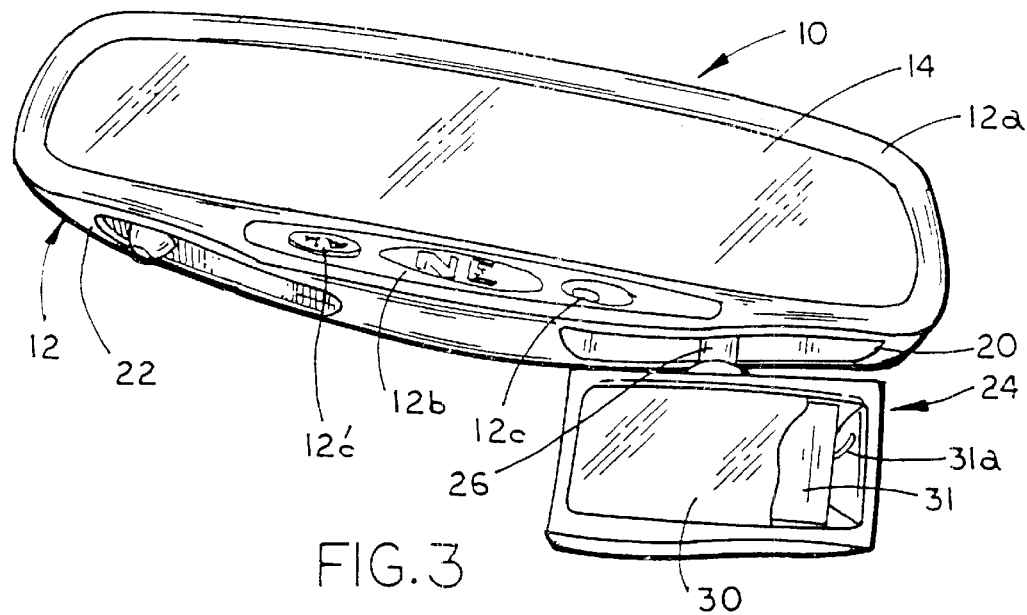
FIG. 3 is a bottom perspective view of the rearview mirror assembly of FIG. 1, with portions broken away, illustrating a pendent accessory in an extended position.
Figure 4:
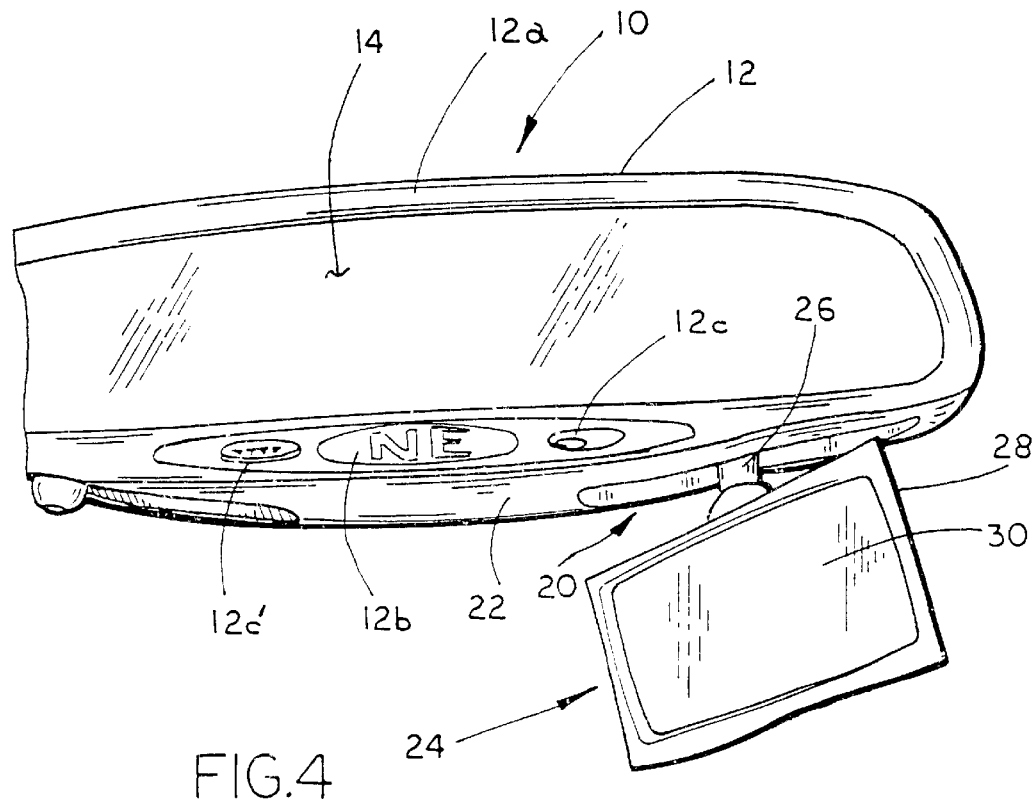
FIG. 4 is a bottom perspective view of the mirror assembly of FIG. 3 illustrating the pendent accessory moved to a second orientation.
Figure 5:
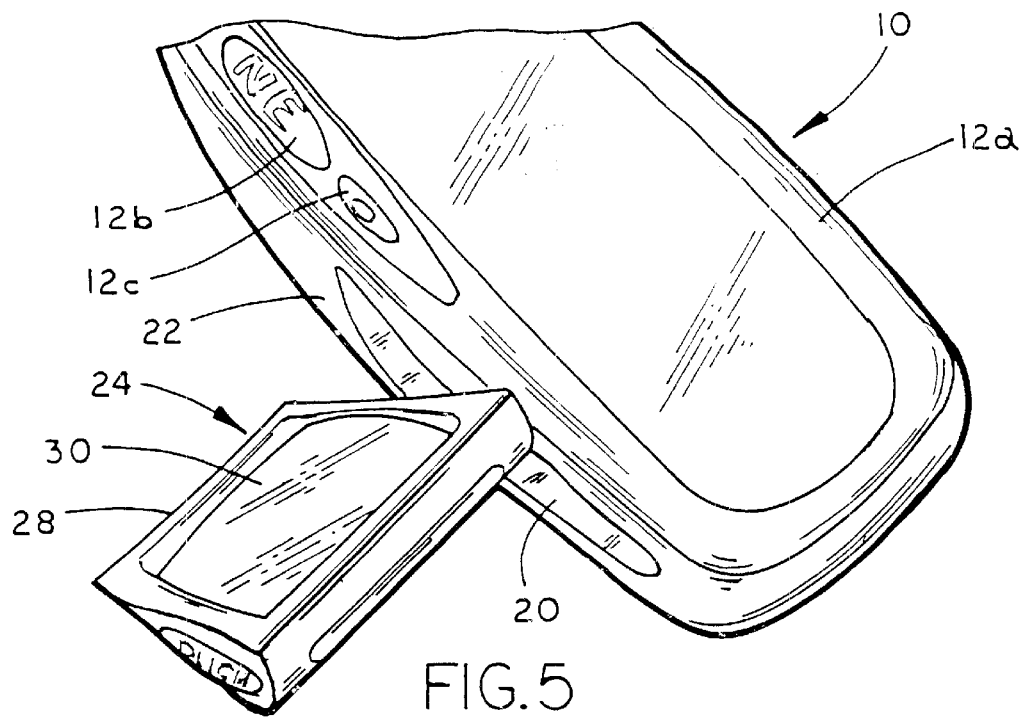
FIG. 5 is an enlarged bottom perspective view of the mirror assembly of FIG. 4, with the pendent accessory positioned in a third orientation.
Figure 6:
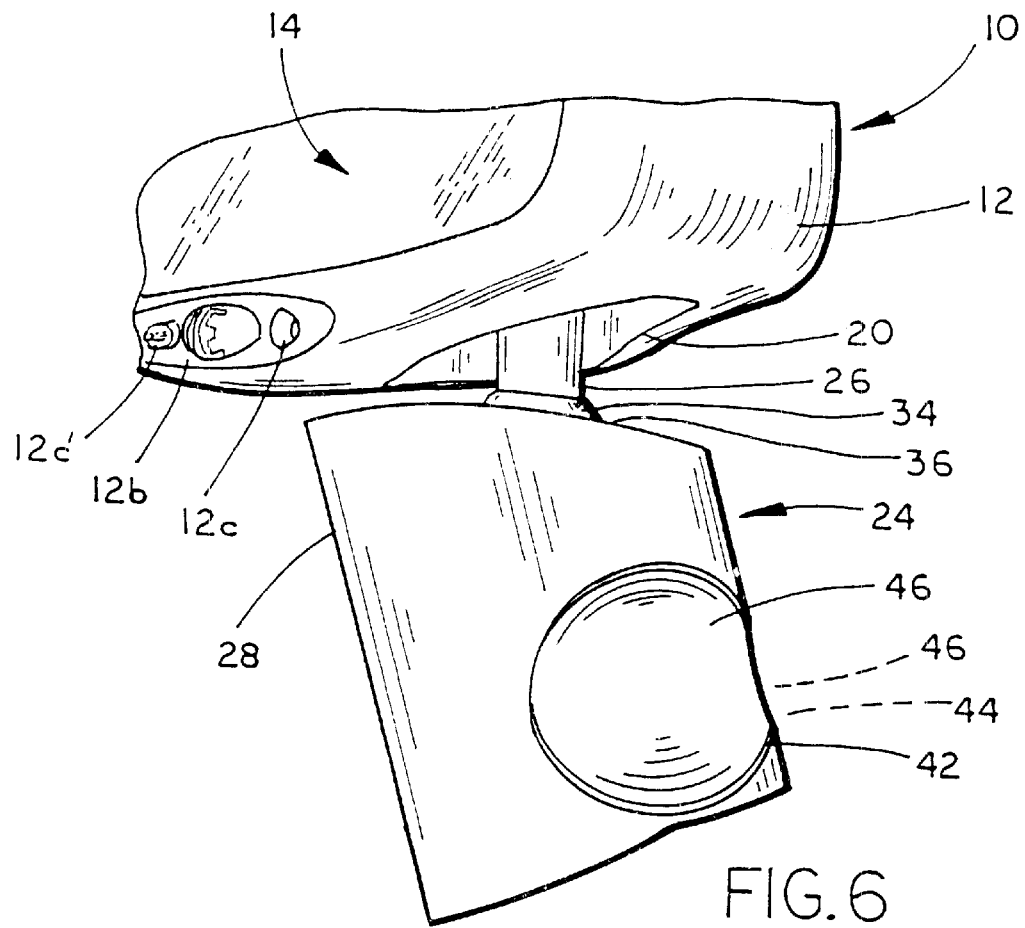
FIG. 6 is an enlarged end perspective view of the mirror assembly of FIG. 5.

Referring to FIG. 3, casing 12 includes a storage space which is provided by a cavity or recess 20 formed in bottom wall 22 of casing 12. Mounted in cavity 20 is a pendent accessory 24, which is preferably mounted in cavity 20 for movement between a fully retracted position (FIG. 8) in which a lower surface 24a of pendent accessory 24 generally follows the contour of casing 12 and is preferably substantially flush with a lower outer surface 22a of lower wall 22 of casing 12. In the illustrated embodiment, pendent accessory 24 is mounted in cavity 20 on an extendible support arm 26 so that dependent accessory 24 may be moved between its retracted and extended positions. For example, support arm 26 may comprise an extendable jack arm or spring-loaded telescoping arm or the like such as is known in the art. As best seen in FIG. 6, support arm 26 includes a ball joint 34 which extends into a receiving structure 36, for example a socket structure, provided in housing 28. In this manner, display accessory 24 is pivotally mounted to support arm 26 to permit repositioning of the display accessory about ball 34. Thus, pendent accessory 24 can be repositioned for easy access or viewing by the driver of the vehicle or by a passenger of the vehicle other than the driver. While in the illustrated embodiment pendent accessory 24 is illustrated as being positioned offset from the center of mirror case, it should be understood that pendent accessory may be centrally located or located on a side of the case. Also, while illustrated in the Figures as an accessory that extends downwards from the bottom of the rearview mirror assembly (i.e. towards the vehicle floor) when mounted in the vehicle, a pendent accessory can extend upwards from the top of the mirror assembly (i.e. towards the vehicle roof area) or sideways (i.e. towards the vehicle side) from either end of casing 12.

Referring to FIGS. 3–8, pendent accessory 24 includes a housing 28 and an element 30 which is positioned in a rearward facing opening 32 of housing 28. Element 30 may comprise a reflective element or mirror for use by an occupant of the vehicle as a vanity mirror or as a mirror to view rear seat passengers (such as a flat, compound curvature, aspheric or convex mirror reflector) such as a baby in a baby seat. Alternately, pendent accessory 24 can form a viewing screen for a baby minder system, such as the vehicle interior monitoring system described in U.S. Pat. Nos. 5,877,897 and 5,760,962 or the rear vision system described in pending U.S. patent applications Ser. No. 09/361,814 filed Jul. 27, 1999, now U.S. Pat. No. 6,201,642, and Ser. No. 09/199,907 filed Nov. 25, 1998, and U.S. patent application Ser. No. 09/433,467 (Attorney Docket No. P-783) filed Nov. 4, 1999, entitled "VEHICLE INTERIOR MIRROR ASSEMBLY" to Patrick Heslin and Niall R. Lynam, now U.S. Pat. No. 6,326,613, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electro-illuminescent sources, and the like, and most preferably such non-incandescent sources are low power and are directed low intensity sources, such as described in U.S. Pat. No. 5,938,321 and application entitled "INTERIOR MIRROR ASSEMBLY FOR A VEHICLE INCORPORATING A SOLID-STATE LIGHT SOURCE", Ser. No. 09/287,926, filed Apr. 7, 1999, now U.S. Pat. No. 6,139,172, which are incorporated herein by reference in their entireties. The baby minder camera may be mounted as a part of the rearview mirror assembly and, most preferably, may be mounted as a part of a header, including a front header of a roof or a rear header of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status Alternately, element 30 may comprise an information display element, in which element 30 conveys information to the vehicle operator and/or other occupants of the vehicle or may be a video screen or the like. For example, pendent accessory 24 may comprise a personal communication device, such as a PALM organizer or the like, including a video screen, preferably a touch sensitive video screen such as PALM Pilot™ such as is available from 3COM, Corp. or the like, which is adapted for input by the touch of a human finger or stylus. In which case, as described in reference to the following embodiments, assembly 10 may include an accessory attachment member, for example such as attachment member 532 (FIG. 20), 756, (FIG. 24), for holding a stylus pen which interacts with pendent assembly 24. Optionally, the stylus is tethered to the mirror assembly, for example a coiled tether or a retractable tether or by other conventional means.

Display element 30 may perform a single display function or multiple display functions, such as providing indication of an additional vehicle function or functions, for example a compass mirror display function, a temperature display function, a tire pressure/status display function, a status of inflation of tires display function, computer display including e-mails and INTERNET access, a passenger air bag disabled display function, an automatic rain sensor operation display function, telephone dial information display function, highway status information display function, blind spot indicator display function, or the like. Such displays may be an alpha-numeric display or a multipixel display, and may be fixed or scrolling. In addition, display element 30 may comprise a television screen and/or video screen. Display element 30 may comprise a generally planar element or may comprise a convex element. Alternately, display element 30 may be separately formed and include tabs or receiving structures on either side adapted to fit within receiving structures or tabs, respectively, formed in the inside surfaces of housing 26 for assembly after molding of housing 26.

Pendent accessory 24 optionally includes a second circuit board 31 (FIG. 3), which is typically mounted adjacent and behind display element 30, which supports light emitting sources, such as light emitting diodes to provide back lighting of display element 30. Light emitting diodes provide low level non-incandescent white light for illuminating indicia on display element 30. However, it should be understood that other LED's providing light and colors other than white, such as amber, red, blue, or the like may be used. Alternately, other light emitting elements can be used to display information on display element 30, such as incandescent displays, vacuum fluorescent displays, electro-illuminescent displays, light emitting diode displays, cathode ray tube displays, field emission displays, E-ink displays, or organic emitting polymer displays or the like. Examples of displays may be found in application entitled "REARVIEW MIRROR ASSEMBLY INCORPORATING VEHICLE INFORMATION", Ser. No. 09/244,726, filed Feb. 5, 1999, by Jonathan DeLine and Niall R. Lynam, now U.S. Pat. No. 6,172,613, or U.S. Pat. No. 5,530,240, and U.S. Pat. No. 6,326,613 (Attorney Docket No. P-783) filed Nov. 4, 1999, entitled "VEHICLE INTERIOR MIRROR ASSEMBLY" to Patrick Heslin and Niall R. Lynam, commonly assigned to Donnelly Corporation, which are herein incorporated by reference in their entireties. Alternately, circuit board 31 may also share components and provide circuitry for other electrical components in mirror assembly 10, thus illuminating the need for mounting such circuitry within the rearview mirror assembly housing itself.

As noted previously, pendent accessory 24 may also incorporate an in-vehicle train approaching warning system. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. Vehicle to road-side communication antennas can be attached to railroad signs, crossing barriers, and the like and can transmit to antennas mounted in the vehicle located such as within assembly 10 or within an interior cabin trim item or side exterior rearview mirror assembly. One such track side communication system is available form Dynamic Vehicle Safety Systems of Amarillo, Tex., which detects signals from trains approaching a crossing and transmits these signals along the road to forewarn of a railroad crossing ahead.

It is also possible to incorporate low level console or instrumentation lighting for vehicles in assembly 10 by fitting a low level non-incandescent light emitting light source such as a light emitting diode for illuminating an instrument panel or console as disclosed in commonly assigned U.S. Pat. No. 5,671,996, the disclosure of which is hereby incorporated by reference. In this embodiment, a single instrument light 13 may be provided on an opposed end of mirror casing 12 and may include a variety of emitting sources such as high intensity amber and reddish orange light emitting diode sources, such as solid state light emitting diode LED sources utilizing double hydro junction AIGaAs/GaAs Material Technology such as very high intensity red LED lamps T/1•(5 mm) HLMP-4100/4101 available from Hewlett Packard Corporation of Pallo Alto, Calif., or transparent substrate aluminum indium gallium phosphide (AlInGaP) Material Technology, commercially available from Hewlett Packard Corporation, of Pallo Alto, Calif. Also, blue or white LEDs can be used or a combination of individual different colored diodes can be used with the color mixing therefrom to form a desired color. Optionally, a plurality of LEDs such as a cluster of four, six, eight or the like LEDs can be used to target and illuminate a local area for higher illumination at that area, such as may be useful in a map light (most preferably illuminating the target area with white light). The concepts of this present invention can be used with other interior rearview mirror assemblies which are equipped with a variety of features and accessories, such as a home access transmitter, a high/low (or daylight running beam/low) headlamp controller, a hands free phone attachment, a video device, such as a video camera for internal cabin surveillance and/or video telephone function, a remote keyless entry receiver, a compass, a seat occupancy detection, multiple reading lights, a trip computer, an intrusion detector, and the like. Display element 30 may also include a compass/temperature and a clock display, fuel level display, and other vehicle status and other information displays.

As it would be understood by those skilled in the art, the electrically operated display and other devices optionally provided in pendent accessory 24 are conveniently connected to the electrical system of the vehicle in which the present invention is mounted via electrical wiring 31a (FIG. 3). The use of pendent accessory 24 with display element 30 comprising the instant invention in conjunction with electrically operated interior rearview mirrors has the further advantage of permitting electrical coupling of the display element to the power supply of the vehicle by the pre-existing wire harnesses serving the rearview mirror. Thus, the electrical coupling of the display element can be by direct connection with the existing wire harness or in parallel through an adapter plug. This particularly facilitates a retrofit such as might occur as in the after-market or at a dealership that is a result of an option selection. Alternately, the interior mirror assembly can include a vehicle power socket, connected to the vehicle ignition system or battery electrical system, (such as the cigarette lighter type socket conventional on many automobile) into which other accessories can be plugged (such as in FIG. 25). For example, a "cigarette-lighter" type of socket can be provided at the rear or at the bottom of the interior mirror case, into which a vehicle occupant can plug an electrically operated (typically 12V) accessory such as a radar detector or the like.

Figure 7:
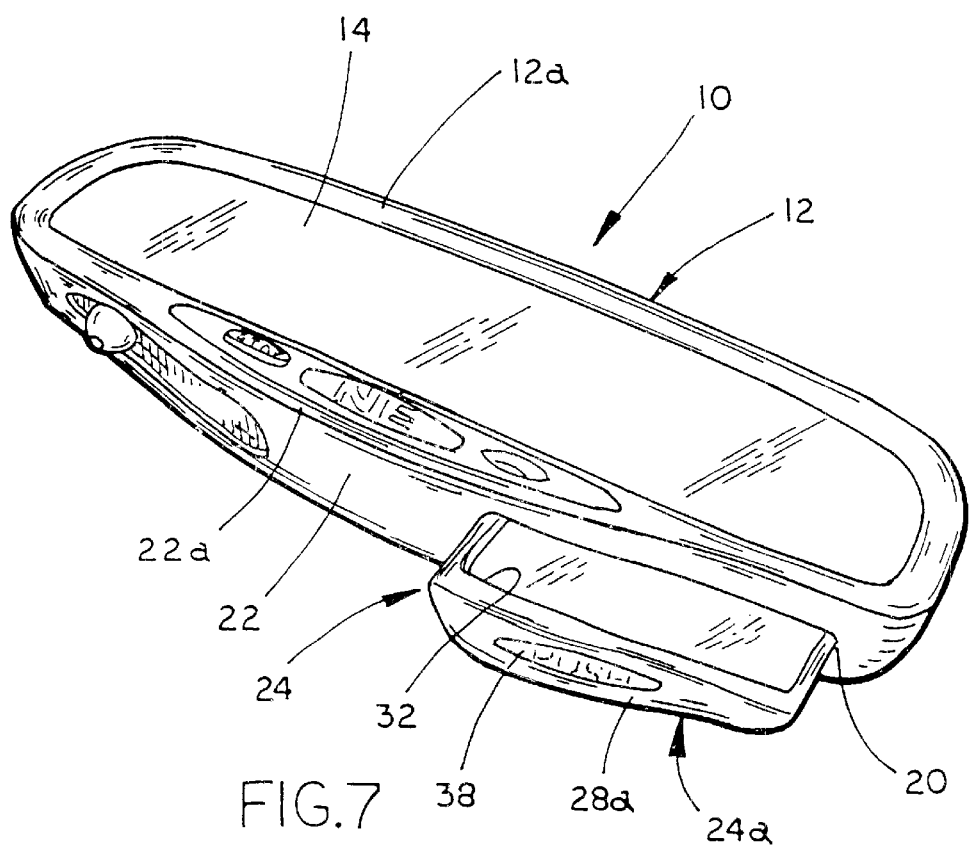
FIG. 7 is a bottom perspective view of FIG. 1 illustrating the pendent accessory of FIG. 3 in a partially retracted position within the mirror assembly housing.
Figure 8:
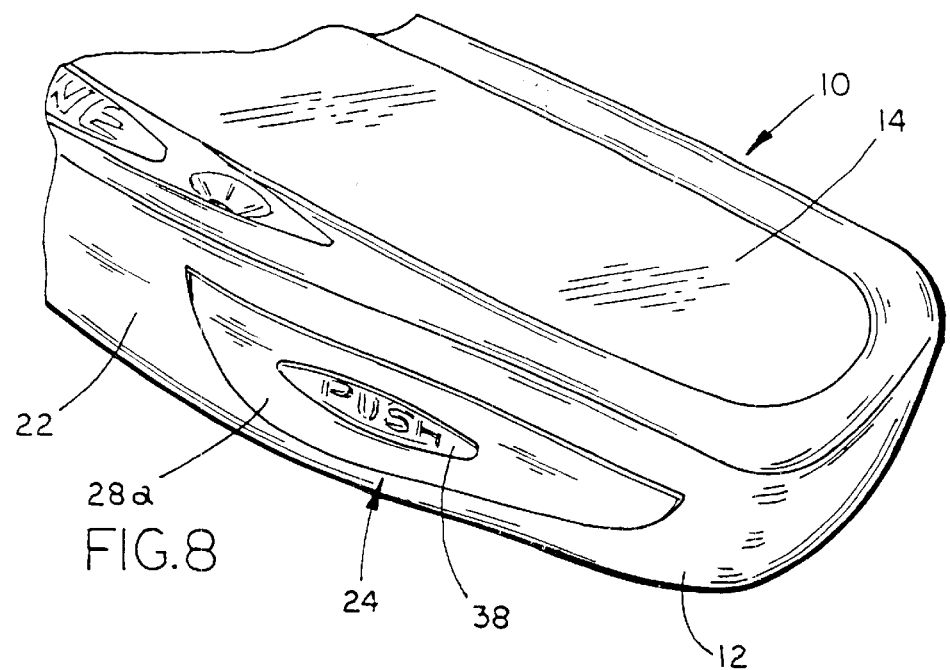
FIG. 8 is an enlarged bottom perspective view of a portion of the exterior rearview mirror assembly of FIG. 1, with the pendent accessory fully retracted within the housing.

Pendent accessory housing 28 preferably comprises a similar material to casing 12 so that when element 30 is moved to its retracted position as shown in FIG. 8, the lower surface 28a of housing 28 will generally match the surface and color of mirror casing 12. Referring to FIG. 7a, support arm 26 preferably comprises a spring loaded support arm and includes an elongated shaft 40 on which ball member 34 is mounted. As best seen in FIGS. 7 and 8, housing 28 may include a recessed surface 38, for example an elongated depression which provides tactile identification of housing 28 and when pushed releases pendent accessory 24 from its retracted position so that pendent accessory 24 can be extended and retracted from the storage space and optionally swiveled and/or universally pivoted about ball member 34 to a desired orientation. Similarly, when returned to its recessed position or storage space, recessed surface 38 is pressed to relatch pendent accessory 24 in its retracted position within casing 12. Such mechanisms are conventional and well known. In this manner, the occupant of the vehicle can quickly selectively insert the pendent accessory into its storage space within case 12 and quickly extend or remove the accessory from its storage space for personal use or use by another occupant of the vehicle.

As best seen in FIG. 6, housing 28 of display assembly 24 includes one or more recessed gripping surfaces 42 and 44 to permit easy adjustment of the position of housing 28 about support arm 26. In the illustrated embodiment, surfaces 42 and 44 comprise round indentations, but it should be understood that other shapes may be used. Furthermore, surfaces 42 and 44 provide tactile identification of housing 28 to permit quick adjustment with minimal distraction to the driver.

By selectively and extensibly positioning a display element or a vanity mirror below casing 12 on the end of casing 12 closer to the passenger side of the vehicle, as shown in FIGS. 3–8, the obstruction to the vehicle operator is minimized. Furthermore, the accessory is located in a position which is well known to the driver and, therefore, requires little concentration to use, and such movement in reaching for the accessory is almost automatic. Such automatic actions require far less attention than actions requiring new movement and will consequently minimize the distraction to the driver as well. Optionally, pendent accessory 24 may be provided with other electrical or electronic features or accessories, such as previously described in reference to mirror assembly 10.

Figure 8A:
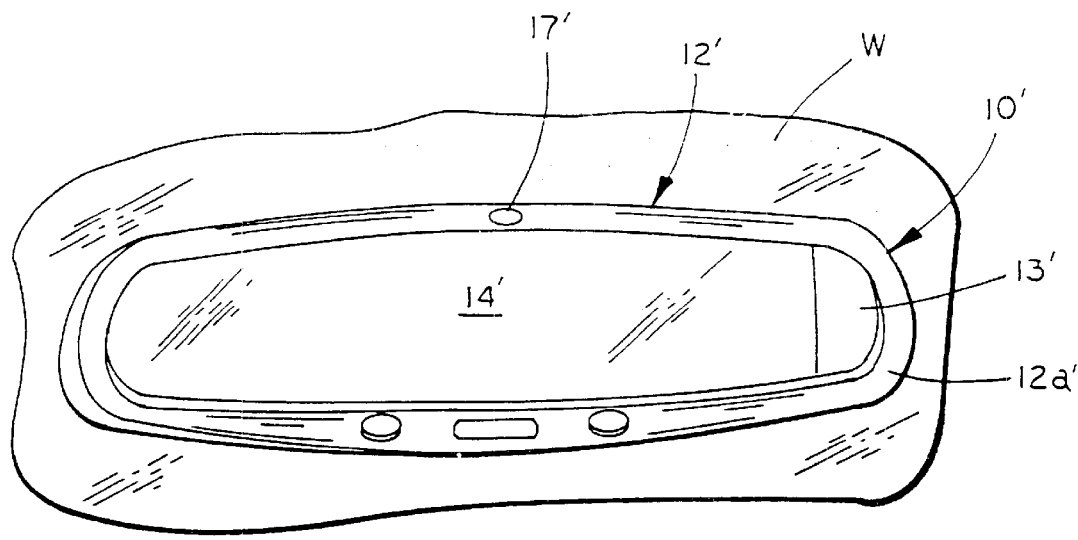
FIG. 8A is a perspective view similar to FIG. 1 illustrating the rearview mirror assembly of FIG. 1 with a display screen adjacent the reflective element.
Figure 8B:
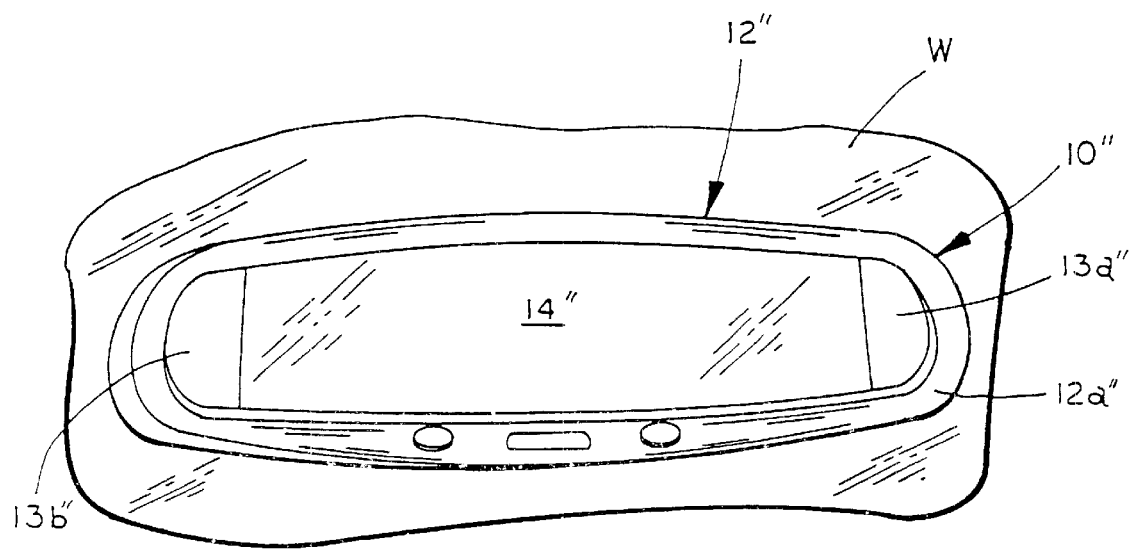
FIG. 8B is a view similar to FIG. 8A illustrating the rearview mirror assembly with a pair of display screens.
Figure 10:
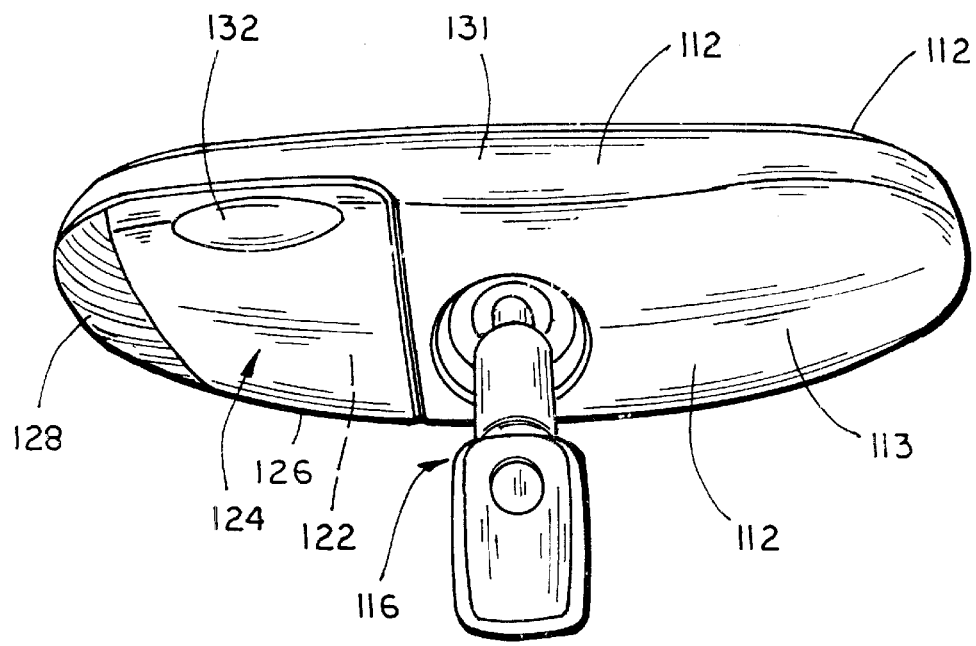
FIG. 10 is a rear perspective view of the mirror assembly of FIG. 9.

Referring to FIG. 8A, mirror assembly 10' may include a video screen 13'. In the illustrated embodiment, display screen 13' is placed to the side of reflector 14' in casing 12'. In preferred form, display screen 13' is separate from reflector 14'. Most preferably, video screen 13' is canted toward the driver when mirror housing 12' is in its normally adjusted position. Video screen 13' can display output from such as a rear vision back-up camera, such as disclosed in applications Ser. No. 09/199,907, filed Nov. 25, 1998, and 09/361,814 filed Jul. 27, 1999, now U.S. Pat. No. 6,201,642, commonly assigned to Donnelly Corporation, the disclosures of which are herein incorporated by reference in their entireties, a baby minder camera, such as the vehicle interior surveillance camera disclosed previously, vehicle instrument status, such as vehicle information display, such as information relating to fuel gauge levels and the like. Referring to FIG. 8B, mirror assembly 10" may include a pair of screen displays 13a" and 13b". In the illustrated embodiment, displays 13a" and 13b" are positioned in case 12" at opposed sides adjacent reflective element 14". Preferably, displays 13a" and 13b" are similarly positioned behind bezel 12a" so that displays 13a" and 13b" generally lie in the same plane as reflective element 14". Optionally, cameras (not shown) may be mounted in case 12" on either side as part of the interior mirror assembly, with one camera feeding display element 13a" and the other camera feeding display element 13b".

Referring to FIGS. 9–14, the numeral 110 designates a second embodiment of the rearview mirror assembly of the present invention. Mirror assembly 110 includes a mirror casing or housing 112, bezel or retaining rim 112a, and a reflective element 114 supported in mirror housing 112. The material of housing 112 is similar to housing 12; therefore, reference is made to housing 12 for further details of suitable materials. Similar reference is made to the first embodiment for further details of mirror reflective element 114.

Extending rearwardly from housing 112 is a mirror support arm 116, which mounts mirror housing 112 by way of a mounting bracket or mirror mount similar to bracket 17 onto a mirror mounting button (not shown) provided on most conventional windshields to form a break-away assembly. Reference is made to support arm 16 and bracket 17 for details of one preferred support arm and preferred mounting arrangements.

As best seen in FIGS. 10–13, housing 112 includes a storage space 122 for holding or storing an accessory 124.

In the illustrated embodiment, accessory 124 comprises a light assembly, such as a flashlight assembly. However, accessory 124 may comprise a cellular phone, a phone module, pager, INTERNET connector, or the like. In the case of docking a telecommunication device such as a phone or a pager, the mirror assembly is preferably adapted to connect to the telecommunication device such as a phone in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

In preferred form, storage space 122 is provided on forward facing side or back wall 113 of housing 112 and comprises a recessed area which extends from an upper wall 112a of housing 112 to a lower wall 112b of housing 112. In this manner, storage space 122 is hidden from view from the occupant of the vehicle, but readily accessible by the driver or other occupants of the vehicle. In preferred form, light assembly 124 includes a housing 126, and a removable lens 128 which form a unitary body 130. Body 130 preferably includes a suitable battery or batteries, which may be rechargeable. Body 130 is preferably commensurate in shape with the outer surface 131 of housing 112 such that when light assembly 124 is mounted in storage space 122, the outer surfaces 130a of unitary body 130 follow the contours of housing 112 and, further, the outer surfaces 130a of unitary body 130 are generally flush with surface of housing 112 surrounding storage surface 122. In this manner, when light assembly 124 is mounted to housing 112, light assembly 124 forms a unitary body having matched and corresponding contours which are flush with housing 112. As would be understood by those skilled in the art, housing 126 supports a bulb and a battery, preferably a rechargeable battery. In preferred form, housing 126 supports a pair of battery contacts 131a which align with contacts 131b provided on casing 112 to permit quick recharging of the battery or batteries inside housing via the vehicle electrical system without the need for disassembling light assembly 124. Alternately, the interior rearview mirror assembly may include a power source, such as a recharger, such as housing 112, that recharges the battery or batteries in the dockable accessory, which is stored or attached thereto. As previously noted, such dockable accessories can include pagers, cellular phones, flash lights or the like. In this manner, accessory 124 can be docked for recharging. In the case of the light assembly, the light assembly can be docked for use as a map reading light or the like. When undocked, light assembly 124 may be used as a flashlight, as previously noted.

In the case of a dockable phone, housing 112 optionally includes at least one speaker and microphone, such as disclosed in U.S. patent application Ser. No. 09/382,720, filed Aug. 25, 1999, by Niall R. Lynam et al., now U.S. Pat. No. 6,243,003. When the phone is docked, the phone may be optionally connected to the vehicle system such that the vehicle system enables the speakers and microphones to provide hands-free operation of the phone. Actuation of the hands-free phone may be achieved when the phone is docked or by a separate switch mounted, for example on the dashboard or, alternately, to the interior mirror assembly.

Alternately, the phone module of a cellular or digital phone may be docked on the mirror housing such that the vehicle system couples the phone module to the speakers and microphones to provide a hands-free phone system. In this manner, the module can be quickly and easily docked and, further, removed for replacement into the phone housing.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in copending provisional application Ser. No. 60/131,593, filed Apr. 29, 1999, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", which is herein incorporated by reference in its entirety. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

A variety of electrical and electronic features can be incorporated into the rearview mirror assembly, such as those disclosed in U.S. patent application Ser. No. 09/433, 467 (Attorney Docket No. P-783) filed Nov. 4, 1999, entitled "VEHICLE INTERIOR MIRROR ASSEMBLY" to Patrick Heslin and Niall R. Lynam, now U.S. Pat. No. 6,326,613, commonly assigned to Donnelly Corporation, which is herein incorporated by reference in its entirety. For example, a microphone or a plurality of microphones may be incorporated, preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865 entitled "A METHOD FOR INDICATING THE PRESENCE OF SPEECH IN AN AUDIO SIGNAL", issued Sep. 25, 1990, to Stettiner et al. (the disclosure of which incorporated by reference herein), are particularly useful to enhance clarity of vocal signal detection when a single microphone is used, located in the interior mirror assembly such as in casing 12, as part of a vehicular wireless communication system such as General Motors' ONSTAR™ system. Use of digital signal processing and a single mirror-mounted microphone (such as is described in U.S. patent application Ser. No. 09/396,179, filed Sep. 14,1999, entitled "INDICATOR FOR VEHICLE ACCESSORY", now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region), digital sound processing is also beneficial when multiple microphones are used. For example a first microphone, mounted in the mirror casing 12, can be directed principally towards the mouth of the driver and a second microphone can be directed so as to detect vehicular ambient noise such from HVAC, windshield vibration etc. A signal indicative of the ambient noise can be generated by processing the output of the second microphone, and this signal can be subtracted from a signal generated by processing the output of the first microphone to form a signal substantially representative of the speech picked up by the first microphone. Techniques and circuitry to achieve such speech enhancement are known in the acoustics art, such as are disclosed in U.S. Pat. No. 5,381,473, issued Jan. 10, 1995, entitled "NOISE CANCELLATION APPARATUS" to D. Andrea, the disclosure of which is hereby incorporated by reference herein. Also, noise cancellation techniques such as destructive interference can advantageously be used, whereby the signal as picked up by the microphone is processed, the human vocal signal is distinguished from the noise signal, and whereby the noise signal is fed back 180 degrees out of phase with itself in order to cancel out the noise by destructive interference and so enhance the vocal signal to background noise ratio. Digital sound processing is preferably accomplished using a microprocessor. A variety of microprocessors can be used such as a single-chip microcomputer optimized for digital signal processing and high speed numeric processing such as the ADSP-218x digital signal processors such as the ADSP-2186 single-chip microcomputer, which integrates 40 kilobytes of on-chip memory (including 8K words (24-bit) of program RAM and 8K words (16-bit) of data RAM) along with serial ports, DMA ports, timers, I/O lines, and interrupt capabilities. The ADSP-2186 microcomputer and the ADSP-218x digital signal processors are available from Analog Devices, Inc., Norwood, Mass. In a vehicle wireless communication system installed in a vehicular cabin, location of the microphone(s) in the interior mirror assembly (such as in casing 12) is advantageous. For digital sound processing of the sound signal detected by the mirror-mounted microphone, an analog to digital converter can be also located at the interior rearview mirror assembly (such as in casing 12) that converts the analog microphone sensor output to digital form. The microprocessor for performing the digital sound processing algorithms and analysis can also be located at the interior rearview mirror location (such as in casing 12). Alternately, the microprocessor performing the digital sound processing analysis can be located elsewhere in the vehicle cabin (such as in the vehicle dash, preferably sharing circuitry with other functions of the vehicle wireless communication system), and with the digitized output signal from the A/D converter linked to the mirror-mounted microphone being fed to the microprocessor via a wire link or via a car area network (a.k.a. controlled area network) or via a vehicular local area network or via an in-cabin, short-range radio transmission network such as via the BLUETOOTH system described below.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, use of a directed microphone directed to a potential human speaker in conjunction with a more omnidirectional microphone/sensor microphone intended to detect background noise can be used. Techniques useful to enhance vocal to noise signal ratio include use of analog and/or digital low-pass filtering to limit examination of signal content to, for example, less than 1000 Hz. or less than 750 Hz. (and so help distinguish vocal signal from noise signals), include use of syllabic rate filtering such as is described in U.S. Pat. No. 4,484,344, include use of a hangover time function such as disclosed in U.S. Pat. No. 4,187, 396, include use of a digital sound switch and dual threshold detection such as disclosed in U.S. Pat. No. 4,052,568 and include noise canceling microphones and techniques such as disclosed in U.S. Pat. No. 5,909,495 (the disclosures of the above cited U.S. patents are incorporated by reference herein). The vehicular microphone can be voice-activated such as by a digital voice operated switch such as is disclosed in U.S. Pat. No. 5,251,263, the disclosure of which is incorporated by reference herein. An adaptive signal processing system can be used to enhance vocal to noise ratio. Adaptive noise cancellation techniques can be used to produce a speech indication signal in response to detection of voice information in the presence of background vehicular noise such as are described in "Adaptive Noise Canceling: Principles and Applications" Proc. IEEE, vol. 63, pp. 1692–1716, December 1975 by B. Widrow et al., and "Adaptive Noise Canceling for Speech Signals", IEEE Trans. Acoust. Speech and Sig. Proc., vol. ASSP-26, No. 5, October 1978, by M. Sambur, and U.S. Pat. No. 5,033,082 entitled "COMMUNICATION SYSTEM WITH ACTIVE NOISE CANCELLATION", issued Jul. 16, 1999, to Eriksson et al, and U.S. Pat. No. 5,251,263 entitled "ADAPTIVE NOISE CANCELLATION AND SPEECH ENHANCEMENT SYSTEM AND APPARATUS THEREOF", issued Oct. 5, 1993, to Andrea et al, the disclosures of which are hereby incorporated herein in their entirety. Mechanical cancellation of ambient noise can be provided, as can a noise canceling pressure gradient microphone, preferably in conjunction with acoustic ports including voice and noise ports. Such a system is disclosed in World Patent publication WO 9817046 A1 to D. Andrea, published Apr. 23, 1998, and entitled "NOISE CANCELING ACOUSTICAL IMPROVEMENT TO WIRELESS TELEPHONE OR CELLULAR PHONE", the disclosure of which is hereby incorporated by reference. A pressure gradient microphone, as known in the acoustic arts, can be used to reduce the background vehicular noise as detected by a vehicular mirror-mounted microphone, or alternatively, an acoustic feedback system, preferably including compensation filters, can be used. Also, closed-loop active noise reduction techniques and other noise reduction techniques can be used such as disclosed in U.S. Pat. Nos. 2,972,018; 3,098,121; 4,833,719; 4,878,188; 4,977,600; and 5,138,664, and in Japanese Patent Abstract No. 3-169199, the disclosures of which are incorporated by reference herein. An adaptive noise cancellation and speech enhancement system and apparatus suitable to use a vehicle with a mirror-mounted microphone is disclosed in U.S. Pat. No. 5,251,263, the disclosure of which is incorporated by reference herein. This adaptive noise cancellation system is particularly beneficial when multiple vehicular microphones are used. Other noise cancellation techniques useful for vehicular microphones, and particularly for mirror-mounted microphones that provide in put to wireless communication systems, particularly in voice-recognition mode, are disclosed in U.S. Pat. Nos. 5,732,143; 5,825,897; and 5,673,325, the disclosures of which are incorporated by reference herein.

Also, an indicator such as disclosed in U.S. patent application Ser. No. 09/396,179, filed Sep. 14, 1999, entitled "INDICATOR FOR VEHICLE ACCESSORY", now U.S. Pat. No. 6,278,377, the disclosure of which is incorporated by reference herein, can be incorporated into the interior mirror assembly that indicates to the driver and/or passengers that speech being detected by a mirror-mounted microphone (or a microphone located elsewhere in the vehicle cabin such as in a header console) is being transmitted and received clearly and error-free by a remote wireless receiver such as an ONSTAR™ operator or a voice recognition system such as is common when calling airlines, services and the like. For example, the signal as wirelessly transmitted from the audio system in the vehicle to the remote receiver may be echoed or retransmitted back to the vehicle where, upon receipt of the retransmitted signal at the vehicle, an in-vehicle voice recognition system interprets the as-received retransmitted signal and either speaks the words/numbers interpreted to the driver for confirmation, or displays the message as received in the vehicle after retransmission so the driver/passenger receives and audible and/or visual indication of what the remote voice recognition transcriber is receiving. If the in-vehicle voice recognition system/in-vehicle indicator is not indicating the expected message, then the driver/passenger will know that the original transmission to the remote voice recognition system was not clear and contained error, and take appropriate action such as repeating the message. By retransmitting back to the vehicle, and confirming in-vehicle, the vehicle occupants can be assured that wireless transmission to the like of a voice recognition system is clear and error-free.

The interior mirror assembly may include a variety of information displays such as a PSIR (Passenger Side Inflatable Restraint) display, an SIR (Side-Airbag Inflatable Restraint), compass/temperature display, a tire pressure status display or other desirable displays, such as those described in U.S. patent application Ser. No. 09/244,726, filed Feb. 5, 1999 now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alpha-numerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/ interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in casing 12, and/or elsewhere in the interior mirror assembly (such as in the housing disclosed in U.S. patent application Ser. No. 09/433,467 (Attorney Docket No. P-783) filed Nov. 4, 1999, entitled "VEHICLE INTERIOR MIRROR ASSEMBLY" to Patrick Heslin and Niall R. Lynam, now U.S. Pat. No. 6,326,613.

Providing a docking capability and/or storage space for the like of a cellular phone has several advantages, especially when used in conjunction with an in-vehicle microphone and ONSTAR™ or similar vehicular wireless communication system. In such a system, the vehicle typically comes equipped from the original equipment manufacturer (typically an automaker such as General Motors, Ford or the like) with an excellent radio/CD/tape audio system with good speakers, amplifiers, graphic equalizers etc. Coupled with a high quality microphone, the quality and power of the vehicular audio system typically exceeds that found in a hand-held cellular phone. Also, when the vehicle is equipped with an ONSTAR™ system, the vehicle is typically already provided with a quality wireless transmitting/receiving antenna, and often with a GPS system as well. Thus, providing a docking function (preferably at the interior rearview mirror but at other location such as the header console or the like is contemplated) has advantages beyond providing a recharging power source to the personal handheld phone (or pager or the like). Once docked (which encompasses linking the portable unit to the interior mirror assembly via a cable or via a cable-less connection such as by a remote IR link), the driver and/or passengers can optionally and preferably make and receive telephone calls via their docked personal phone, but with the audio system being provided by the in-vehicle, pre-existing, speakers, amplifiers, microphone etc. Preferably, whenever a phone call is initiated, any radio station or other music or play though the vehicle audio system is turned off for the duration of the phone call. Also, the ringing tone indicating a call is being received at the docked personal phone preferably sounds through the car audio system so that it is audible even if the car audio is playing music or the like. In this manner, the driver and/or passenger can be contacted via their personal cellular phone number while driving on the highway. As regulations increase forbidding the use cellular phones while driving, unless hands-free, use of the existing vehicle audio system to make and receive calls is advantageous as quality of sound is enhanced thereby. The present invention contemplates a personal cellular phone having a detachable module that includes the circuitry that makes that phone specific and unique in terms of caller identifier. Thus, when the driver, for example, enters the vehicle, he/she detaches the identifier module from the personal mobile hand-held cellular phone and plugs it to a receiving portion of the in-vehicle wireless transmission system (that may comprise an antenna, speakers, an amplifier, a microphone, a keypad etc). Once the identifier module is plugged into the vehicular wireless communication system, the vehicle wireless communication system now emulates the hand-held personal phone, allowing calls be made or received at the personal phone number of the owner of the personal cellular phone. All such in-vehicle communication can be in voice-recognition mode, or a keypad can be provided for the driver to key in a phone number. Although illustrated here for a cellular phone, these concepts have broad application to like of hand-held computers and the like. Also, soon all cellular phone calls will be traceable as to the geographic location of the call. Thus, by making a call from the vehicle, the location of the vehicle is traceable by the likes of the phone service provider such as MCI, SPRINT and the like. Thus, the geographic location of the vehicle can be identified by the driver placing a call. A user-operated "SOS" button can be provided in the vehicle such that, when activated, a cellular phone call is initiated, this call is directed to the cellular phone company, the cellular phone company identifies the vehicle's location, and the cellular service provider, once the vehicle's location is identified, automatically connects the phone to the emergency "911" service particular to the location of the vehicle. Thus, no matter where the call is made from, the driver of the vehicle is automatically connected to the emergency services.

Also, where a dockable accessory is used and in other situations, the interior mirror assembly may include a recharging unit and/or a low voltage (typical less than 10 volts, such as 5 volts or lower) power source (preferably of direct current power) to power the likes of a cellular phone, lap-top computer of the like. A socket for this purpose may be provided on the mirror casing 12 (or elsewhere on the interior mirror assembly), or a powering and/or recharging cable can be stores in casing 12, and pulled out (preferably under spring-load so as to automatically rewind) as required to power the accessory. Preferably, the recharging unit, including any associated electronic circuitry, is housed in casing 12 of the interior rearview mirror assembly.

Figure 9:
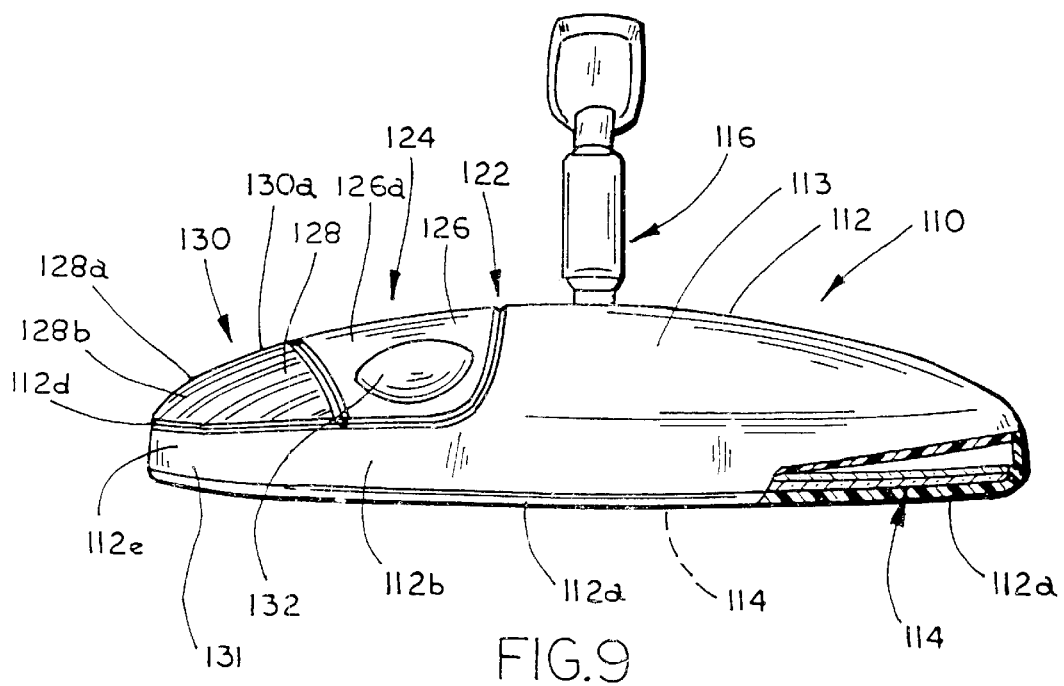
FIG. 9 is a top plan view of an interior rearview mirror similar to FIG. 1 illustrating the mirror housing incorporating a flashlight assembly.

Referring to FIG. 9, housing 126 of light assembly 124 is preferably made from a similar material to housing 112 so that when light assembly 124 is docked or mounted to housing 112, outer surface 126a of housing 126 blends with or matches outer surface 131 of housing 112. Lens 128 preferably includes an outer surface 128a which is substantially continuous with outer surface 126a of housing 126 and further includes a rounded end portion 128b, which generally follows the outer periphery 112e of housing 112. In this manner, when light assembly 124 is mounted to housing 112, light assembly 124 follows the contours of housing 112 and provides a smooth substantially continuous surface with outer surface 131 of housing 112. Examples of suitable materials for lens 128 may be found are acrylic and polycarbonate.

Figure 11:
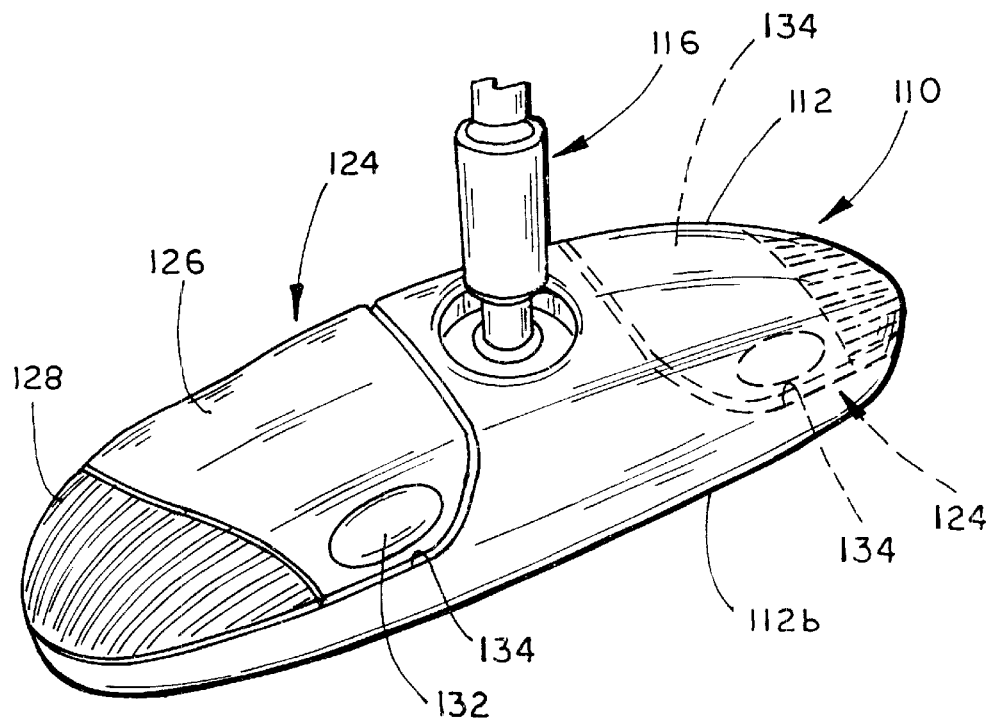
FIG. 11 is a top perspective view of the mirror of FIG. 9.
Figure 12:
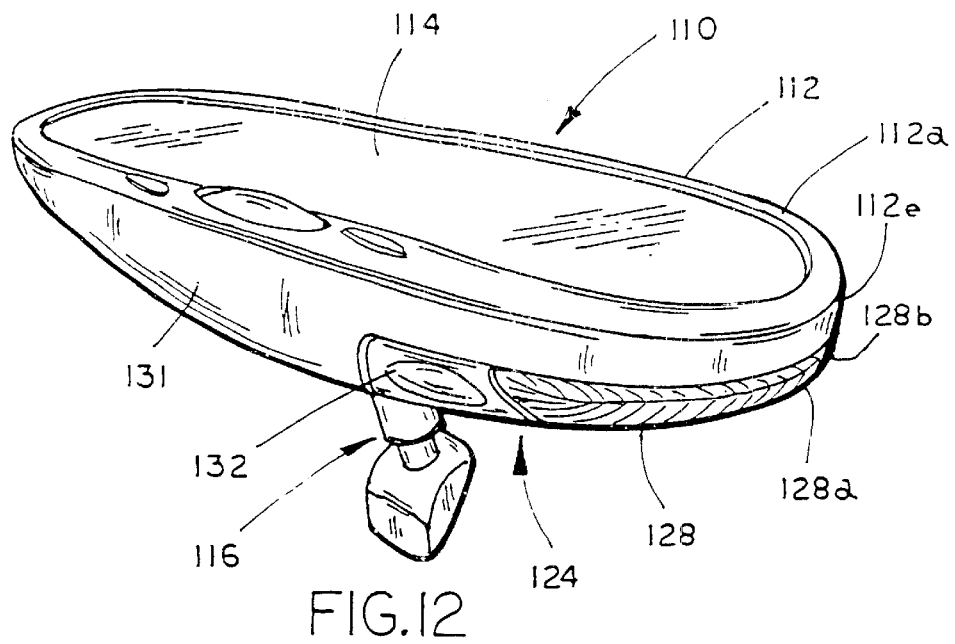
FIG. 12 is a bottom perspective view of the mirror assembly of FIG. 9.

As best understood from FIGS. 9 and 11, light assembly 124 optionally includes a pair of engagement surfaces 132 which provide tactile identification of assembly 124 so that assembly 124 can be quickly located without visual contact. In addition, engagement surfaces 132 provide gripping surfaces for the occupant so that light assembly 124 can be quickly disengaged from housing 112 or returned to or docked in its storage space on the rear wall or forward facing side of housing 112.

Figure 13:
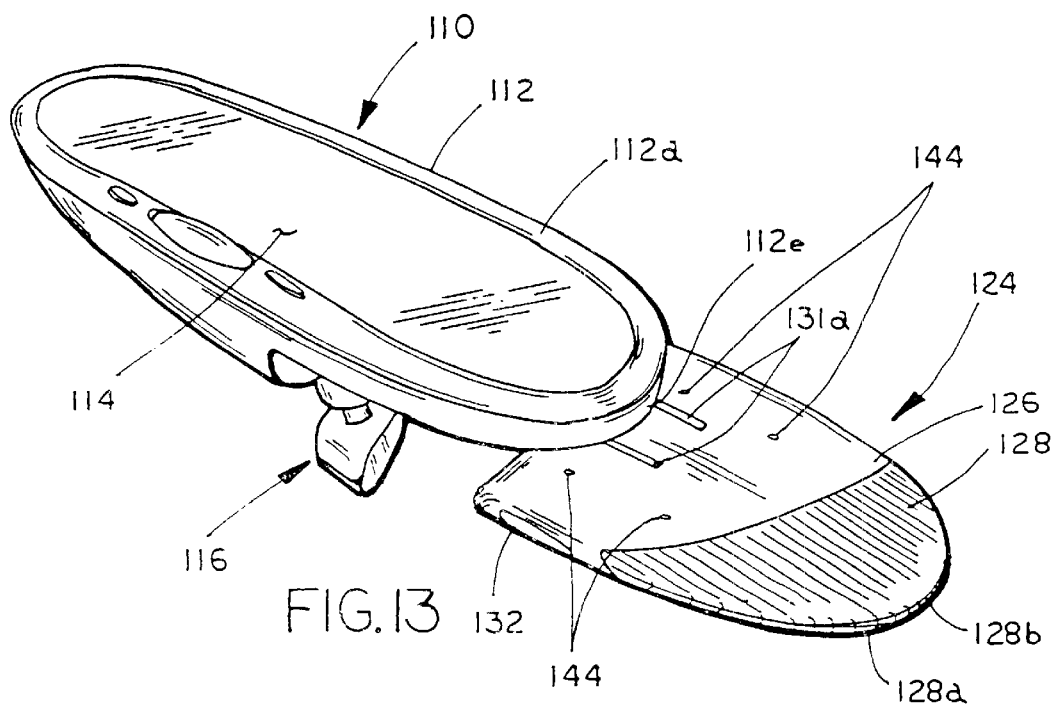
FIG. 13 is an exploded bottom perspective view of the mirror subassembly of FIG. 9.
Figure 14:
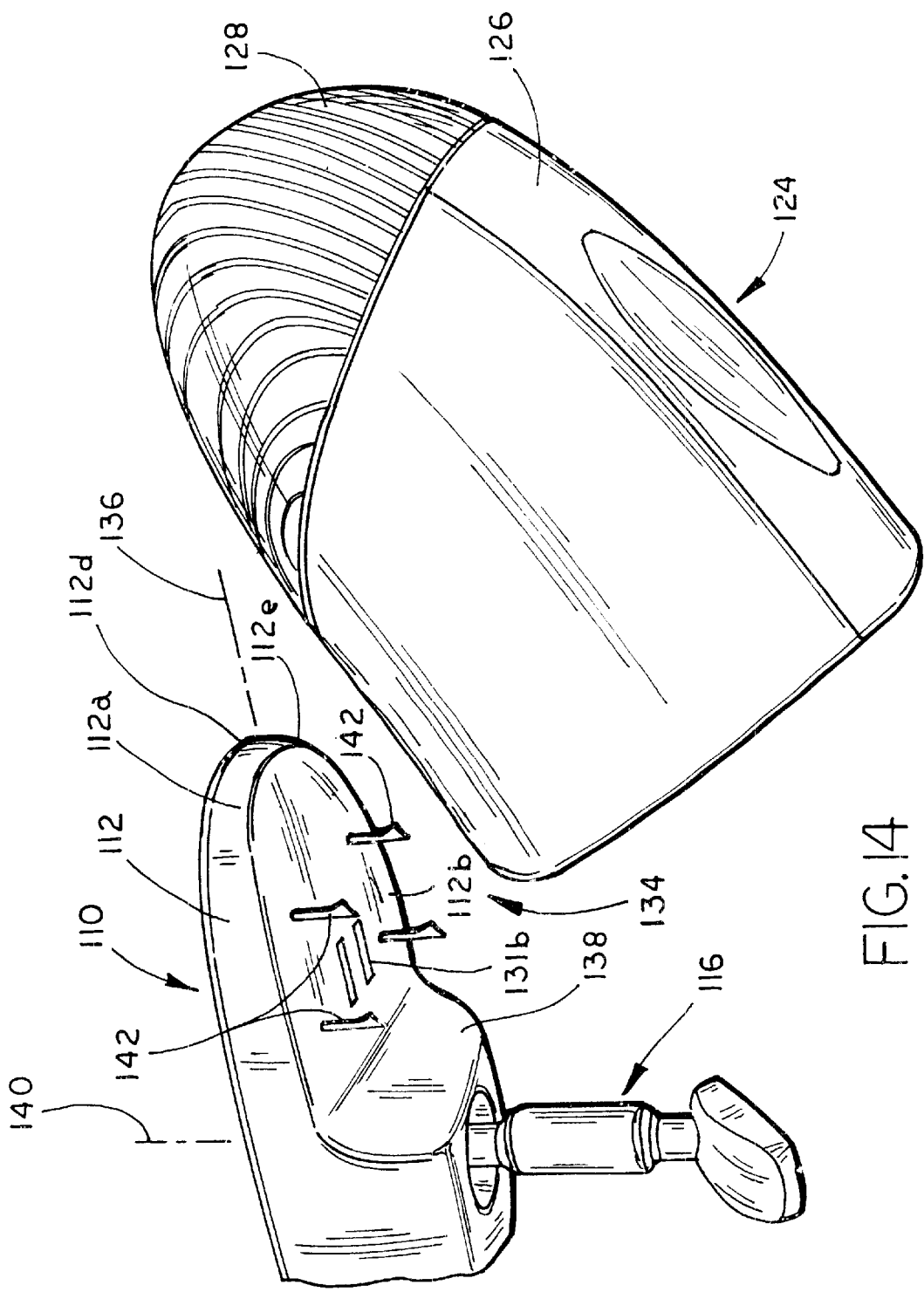
FIG. 14 is a partial rear exploded perspective view of the mirror assembly of FIG. 9.

In preferred form, storage space 122 is defined by a first generally planar recessed wall section 134 (FIG. 14) of housing 112 which extends along an axis 136. Axis 136 is generally parallel to the reflective element assembly 114. Planar surface 134 is bounded by upper and lower walls 112b and 112c and end wall 112d of housing 112 and further by a second planar recessed wall 138 of housing 112. In the preferred embodiment, second planar recessed wall 138 extends at a slight angle to an axis 140 (see FIG. 9) which is substantially orthogonal to axis 136 and to upper and lower walls 112b and 112c of housing 112. Similar to planar wall 134, planar wall 138 extends between upper and lower walls 112a and 112b to form with planar wall 134, a slightly open, L-shaped configuration. In preferred form, planar wall 134 includes one or more projecting members 142 (FIG. 14), for example bayonet type connectors, which extend outwardly from planar wall 134. In the illustrated embodiment, planar wall 134 includes four projecting members 142 for engaging corresponding receiving structures, for example openings 144 provided on housing 126 of light assembly 124 (FIG. 13). Receiving structures 144 are configured to receive projecting members 142 and to releasably couple light assembly 124 to housing 112, as would be understood by those skilled in the art. Alternately, housing 112 may include receiving structures with light assembly 124 including projecting members. Other releasable couplers which may be used include rails that provide a sliding arrangement of light assembly 124 onto housing 112. In addition, light assembly 124 may be coupled to housing 112 by Velcro or magnets or a combination of magnets and metal inserts. In this manner, light assembly 124 may be quickly and easily removed from housing 112 for use by the operator or passenger of the vehicle.

Figure 15:
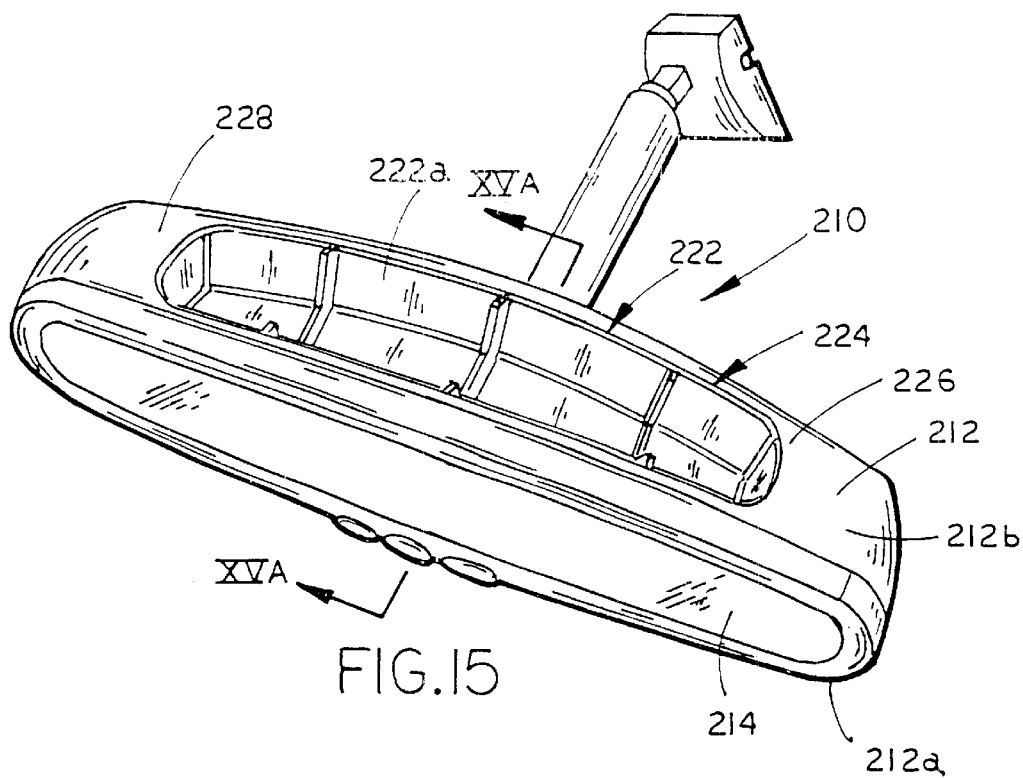
FIG. 15 is a top perspective view of a third embodiment of the rearview mirror assembly of FIG. 1 illustrating a recessed storage space for supporting or holding accessories.
Figure 15A:
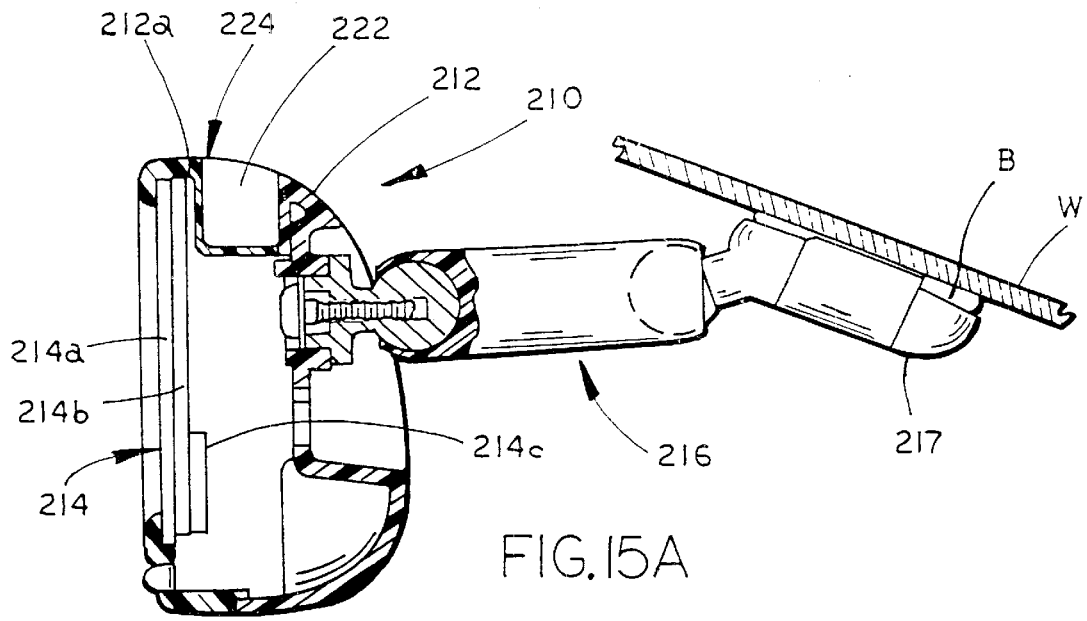
FIG. 15A is a partial fragmentary view taken along line XVA—XVA of FIG. 15.
Figure 16A:
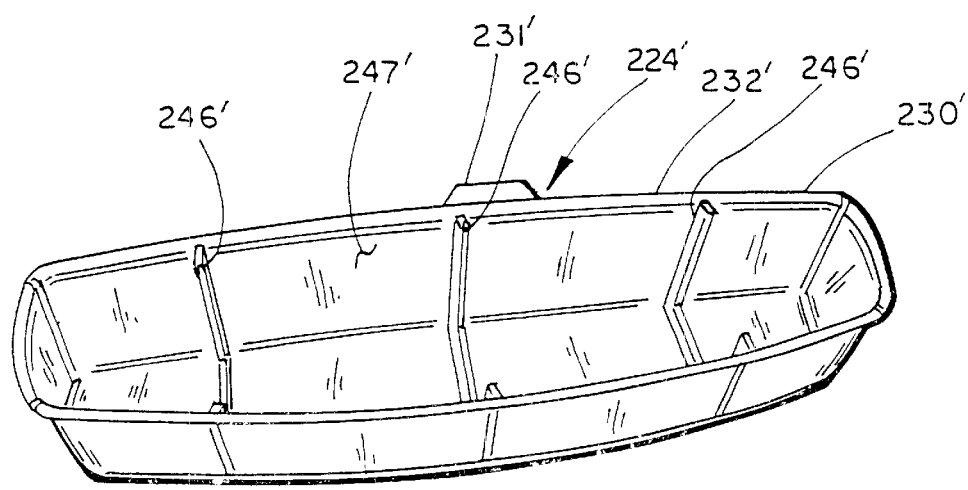

Referring to FIG. 15 and FIG. 15A, a third embodiment 210 of the rearview mirror assembly of the present invention is illustrated. Rearview mirror assembly 210 includes a mirror casing or housing 212 and a reflective element 214, similar to the first and second embodiments. Housing 212 is mounted to a windshield button B, which is adhered to windshield W in a conventional manner, by a break-away mounting bracket or mirror mount 217 and support arm 216. Reference is made to support arm 16 and bracket 17 for further details. As noted in reference to the first embodiment, mirror assembly 210 may be alternately mounted to a headliner of a vehicle, as would be understood by those skilled in the art. Housing 212 includes a bezel or retaining rim 212a which extends around the periphery of the rearward opening of housing 212 and over a peripheral edge portion of reflective element 214. Bezel 212a may optionally include one or more displays, buttons, or indicators, such as LED's, as noted in reference to the first embodiment.

In the illustrated embodiment, mirror housing 212 includes a storage space 222 for storing accessories, for example sun glasses, tools, including pocket knives or Swiss army knives, pencils, keys, coins, paper money, credit cards, pass cards, including toll cards, access cards, paperwork, such as registration or insurance papers, or the like. In addition, storage space 222 may be used for holding trash, such as scrap paper, food or candy wrappers, or the like. As used herein, "accessories" includes a wide range of objects that can be used by the driver or other occupants of the vehicle, including money, tools, including writing instruments, parking receipts, glasses, gloves, cosmetics, paper products, such as writing pads, kleenex, cleaning products, such as wipes, eye glass cleaning supplies, cards, such as business cards, credit cards, access cards, or the like. It should be understood that this list of objects is not exhaustive and merely an example of the various objects that can be stored in the mirror location. In the illustrated embodiment, storage space 222 comprises an open storage space defined by a trough-shaped recess 224 which extends into top wall 212b of housing 212 and which includes an access opening 222a. It should be understood that the shape of the storage space may be adjusted as desired; for example, recess 224 forming the storage space may be cylindrical in order to provide a storage space for a cylindrical accessory such as a cup, container, or the like. In this manner, storage space 222 provides a cup holding function. In the illustrated enbodiment, opening 222a extends over the full length and width of recess 222. But, it should be understood that opening 222a may be reduced over either or both its length and width In addition, it should be understood that casing 112 may include a pair of recessed portions formed on opposed ends of the casing, with each of the recessed portions storing a light assembly.

Figure 16:
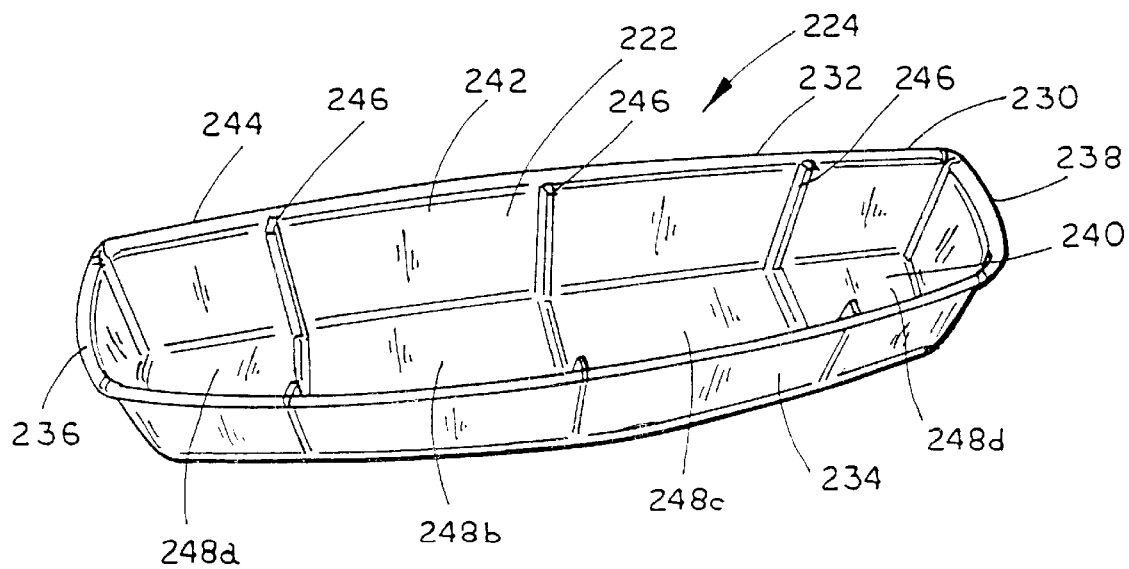
FIG. 16 is an enlarged perspective view of an insert module for inserting into the mirror assembly casing of FIG. 15 defining the recessed storage space.

Referring to FIG. 16, recess 224 comprises a plastic trough-shaped unitary body 230 which includes side walls 232 and 234, end walls 236 and 238, and a bottom wall 240. Extending around the open mouth 242 of body 230 is a lip 244 which may be formed or positioned on upper surface 228 of housing 212 to provide a tactile identification of recess 224. Alternately, lip 244 may be formed generally flush with upper surface 228 of upper wall 212b such that body 230 does not create any irregularities in the outline of casing 212. Optionally, case 212 may be molded with an opening formed in upper wall 212b, with the storage space 222 being separately molded and inserted into the opening of the case 212. Preferably, the bin or tray may be adapted, such as by sizing, to have a snug fit into the opening whereby the bin or tray is removable for cleaning or substitution with alternate bin configurations. Alternately, the insert may be fixed in the opening, for example, by ultra sonically welding or by other suitable fastening methods, such as suitable adhesives, or releasable couplers such as snap fingers which are known in the art. Alternately, storage space 222 may be molded with the mirror case such that the upper wall of the mirror case is shaped so that the outer upper surface forms the bin.

Referring again to FIG. 16, body 230 may include one or more reinforcing ribs 246. Ribs 246 project inwardly from side walls 232, 234 and bottom wall 240 to form generally U-shaped dividers. In the illustrated embodiment, ribs 246 define four compartments or sub-spaces 248a, 248b, 248c, and 248d, which prevent shifting of smaller articles such as coins, keys, or the like in storage space 222 or along body 230. Furthermore, ribs 246 provide lateral support for glasses placed in body 230.

Referring to FIG. 15A, reflective element 214 may comprise an electrochromic element of an electrochromic element module. The electrochromic mirror element, for example, includes two substrates 214a and 214b (typically glass substrates) with an electrochromic medium 214d sandwiched between the substrates. The electrochromic element module preferably includes a printed circuit board (PCB) 214c which may be attached to its rear surface as shown in FIG. 15A, by for example an adhesive. An example of such an arrangement as disclosed in U.S. Pat. No. 5,820,245, commonly assigned to Donnelly Corporation, which is incorporated in its entirety by reference herein. The PCB optionally includes glare sensing and ambient photo sensors and assembly electrochromic circuitry that automatically dims the reflectivity of the electrochromic mirror element when glare conditions are detected at night time when mounted in the vehicle. Alternately, the PCB may be snap connected, by a clip or otherwise attached, to a plastic plate that itself is adhered to the electrochromic element. Importantly, the electrochromic module comprising the electrochromic reflective element and attached electronics, may provide scatter proofing means, and the like. Preferably, the electrochromic element module forms a relatively slim package, at its widest cross-section the package is preferably less than or equal to about 25 mm in dimension, more preferably less than or equal to about 15 mm in dimension, and most preferably less than or equal to about 8 mm in dimension. By placing, as shown in FIG. 15A, all necessary electronics and reflector element forward in the case toward the driver, the space between the rear of the reflector module can be utilized for storage, such as by way of recess 224. As illustrated in FIG. 15A, the storage space 222 is located in case 212 at a location behind the reflective element 214. Preferably, the reflective element comprises a front substrate and a rear substrate with an electrochromic medium disposed between, such as a solid polymer matrix electrochromic medium such as is disclosed in U.S. patent application Ser. No. 09/350,930 filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the frontmost surface of the rear substrate (the third surface as known in the mirror art) is reflector coated with a high reflecting metal film such as of aluminum or silver, or an alloy of aluminum or silver. Also, and as illustrated in FIG. 15A, storage space 222 is located behind the reflective element 214, and is positioned in the space between the reflective element and the windshield W of the vehicle, when the interior rearview mirror assembly is mounted in the vehicle. Preferably, the trough-shaped storage space has length dimension (parallel to the long dimension of casing 212) of at least about 3 inches, more preferably at least about 4 inches, most preferably at least about 5 inches), and width dimension (perpendicular to the long dimension of casing 212) preferably of at least about 0.75 inches, more preferably at least about 1.5 inches, most preferably of at least about 2.5 inches.

Optionally, the front surface of the front substrate (i.e. the first surface as known in the mirror art) 214*a* can be coated with a surface coating or otherwise modified so as to reduce the build up of condensation or mist such as can occur in humid climates. For example, the front surface of the front substrate 214*a* (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system such as is disclosed in Japanese Patent Abstract JP11050006A, issued Feb. 23, 1999, titled "Pretreatment of surface Forming Photocatalytic Hydrophilic Film and Cleaning Agent and Undercoating Composition Used Therein" to Mitsumasa et al of Toto Ltd, and in JP10330131A, issued Dec. 15, 1998, titled "Hydrophilic Thin Film and Vehicular Mirror and Glass Product Using The Same Hydrophilic Thin Film" to Tsutomu et al of Ichikoh Ind Ltd, and in JP10036144A, issued Feb. 10, 1998, titled "Antifogging Element" to Toru et al of Murakami Corporation, and in U.S. Pat. 5,724,187, issued Mar. 3, 1998, titled "Electrochromic Mirrors and Devices" to Varaprasad et al of Donnelly Corporation, the disclosures of which are hereby incorporated by reference herein. Also, such wetting characteristic modification coatings and techniques, such as photocatalytic hydrophilic coatings, can be used for the first (frontmost) surface of a non-electrochromic reflective element such as a prismatic interior mirror reflective element (and for the first surface of electrochromic exterior mirror reflective elements and of metal coated, such as chromium coated, exterior non-electrochromic mirror reflective elements).

The present embodiment provides a rearview mirror assembly with a storage location that is easy to reach and, further, when used does not cause the driver to redirect his or her eyes far, or if at all, from the front of the vehicle. The use of a mirror location also minimizes eye strain. In this manner, the unused space behind the electrochromic reflective element mirror assembly is optimally used. Furthermore, since the mirror assembly is a known location in the vehicle, drivers can reach up to the mirror assembly without mental distraction since the movement is essentially a reflex action or an automatic movement which does not require much, if any, concentration from the driver. Therefore, the mirror assembly 210 which is centrally mounted provides an ideal location for storage space and does not obstruct the driver's view.

Referring to FIG. 17, a fourth embodiment 310 of the interior rearview mirror assembly of the present invention is illustrated. Similar to the previous embodiments, rearview mirror assembly 310 includes a mirror casing or housing 312 and a reflective element 314, which is mounted to a windshield button by a support 316. Reference is made to the first embodiment for details of reflective element 314, optional components on or in housing 312, and suitable material for housing 312.

Assembly 310 includes a storage space 322 incorporated into housing 312, which like the previous embodiment is easily accessible to the driver or other occupants of the vehicle without much distraction or obstruction to the driver's view. In the illustrated embodiment, reflective element 314 is mounted to a bezel or retaining rim 312*a* which supports reflective element assembly 314 in housing 312. Storage space 322 is provided by a storage bin 324 which is mounted to bezel 312*a* to provide a compartment within housing 312. Referring to FIG. 18, bezel 312*a* is pivotally mounted to housing 312 by one or more hinge connections 326 (only one shown). In this manner, bezel 312*a* comprises a pivotal door or hatch that provides access to the inside of casing 312. Hinge connections 326 are preferably mounted rearward of bezel 312*a* so that hinges 326 are hidden from a vehicle occupant's view. For example, each hinge 326 preferably comprises a pair of tabs or flanges 328, which are formed or welded to the rearward surface of bezel 312*a*, and corresponding tabs or flanges 330, which are welded to the lower wall 332 of housing 312. Tabs 328 and 330 are pivotally coupled together by a pin 334 which extends through the respective tabs or flanges to permit bezel 312*a*, reflective element 314 and bin 324 to be moved between a closed position in which storage bin 324 is contained within housing 312 and reflective element 314 is positioned for rearward viewing and an open position illustrated in FIGS. 17 and 18 to provide access to storage space 322. Storage space 322, therefore, provides storage for accessories such as glasses, pens, money, keys, or the like similar to the previous embodiment. Storage space 322 can also serve as a waste bin, and in this regard, it is preferable that the bin be removable for cleaning.

In the illustrated embodiment, bin 324 extends substantially the full length of the interior housing 312; however, it can be appreciated that bin 324 may be shaped or shortened to accommodate components within housing 312, for example electrical wiring or other components described in reference to the first embodiment of interior rearview mirror assembly 10.

In preferred form, bezel 312a supports a latch, such as a spring bias latch 336 for engaging an engagement structure 338 provided on housing 312. Engagement structure 338 comprises a U-shaped loop with an engagement surface or opening to receive latch 336. Preferably, latch 336 and engagement structure 338 are located at peripheral portion 340 of opening 342 of housing 312. Most preferably, latch 336 lies in the same plane as bezel 312a when in the locked position so that it does not create a discontinuity in the outline of the mirror assembly and potentially create a distraction to the driver. It should be understood, that bezel 312a may be biased in its closed position by a spring biased hinge, thus eliminating the need for a latch. In addition, it can be appreciated that the size and shape of bin 324 may be varied and, furthermore, may be compartmentalized with intermediate walls or ribs, as noted in reference to the previous embodiment.

Figure 19:
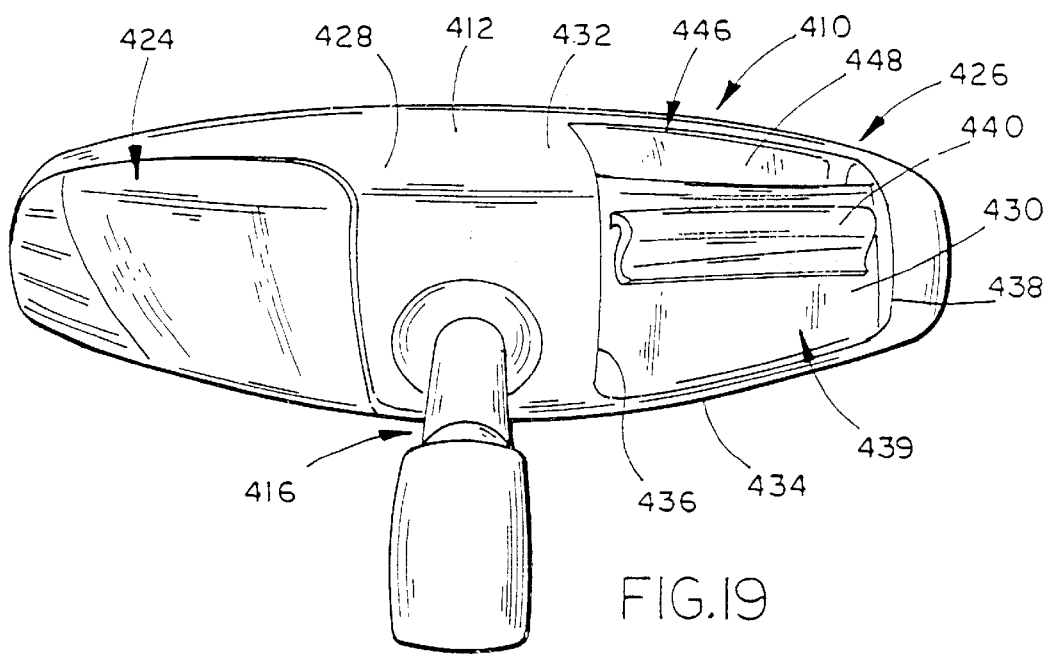
FIG. 19 is a rear perspective view of a fifth embodiment of the interior rearview mirror assembly FIG. 1 illustrating a flashlight assembly module mounted to a first storage space and a second storage space with a clip for holding an accessory and a third storage space for holding other accessories.

A fifth embodiment 410 of the rearview mirror assembly of the present invention is illustrated in FIG. 19. Rearview mirror assembly 410 is of similar construction to mirror assembly 10 and includes a housing 412, a support 416 and mounting bracket, for mounting housing 412 to a windshield button or the like, a reflective element (not shown), and a bezel (not shown). Mounted to a forward facing side or rear wall 428 of housing 412 is a light assembly 424, similar to light assembly 124. Therefore, reference is made to assembly 110 for details on light assembly 424 and other dockable accessories and their preferred mounting arrangements to housing 412.

In the illustrated embodiment, housing 412 includes a second storage space 426 which is provided on forward facing side or rear wall 428 of housing 412. Storage space 426 is defined by a recessed area in back wall 430 which extends from an upper wall 432 of housing 412 to a lower wall 434 of housing 412. Back wall 430 is generally planar and extends between two opposed side walls 436 and 438 which extend inwardly to form, together with back wall 430, recess 439. Projecting outwardly from back wall 430 is another storage space provided by an accessory attachment member 440, such as a clip for supporting generally flat accessories, such as a toll card, an access card, a parking ticket, a note pad, insurance or registration papers, maps, or the like. Preferably, such a clip positively grips the accessory such as by spring tension action or the like onto back wall 430, such that the accessory is easily insertable and detachable or removable from the accessory attachment member. In the illustrated embodiment, accessory attachment member 440 extends substantially over back wall 430 between side walls 436 and 438, but it should be understood that attachment member 440 may be shortened and extend over a smaller distance while still providing the same function.

In preferred form, attachment member 440 comprises a plastic material similar to housing 412. Attachment member 440 may be mounted to back wall 430 either by an adhesive or fasteners or the like. Moreover, attachment member 440 may be welded to back wall 430. Preferably, attachment member 440 is molded together with housing 412. Alternately, attachment member 440 may comprise a metal clip and secured by adhesives or other fastening means to housing 412.

Optionally, housing 412 may include a fourth storage space 446 provided on rear wall 428 for storing other accessories including, for example coins, tokens, work pieces, such as pens, pencils, tools, pen lights, cassettes, CD's, a pager, or the like. In the illustrated embodiment, fourth storage space 446 comprises an elongated cavity or recess 448 formed in upper wall 432 of housing 412 which extends between end walls 436 and 438 behind a back wall 430. Recess 448 may extend the full height of back wall 430 or may terminate at some intermediate height behind back wall 430. It should be understood that storage space 446 may include intermediate ribs or intermediate walls to define separate compartments within storage space 446, as described in reference to mirror assembly 210.

Figure 20:
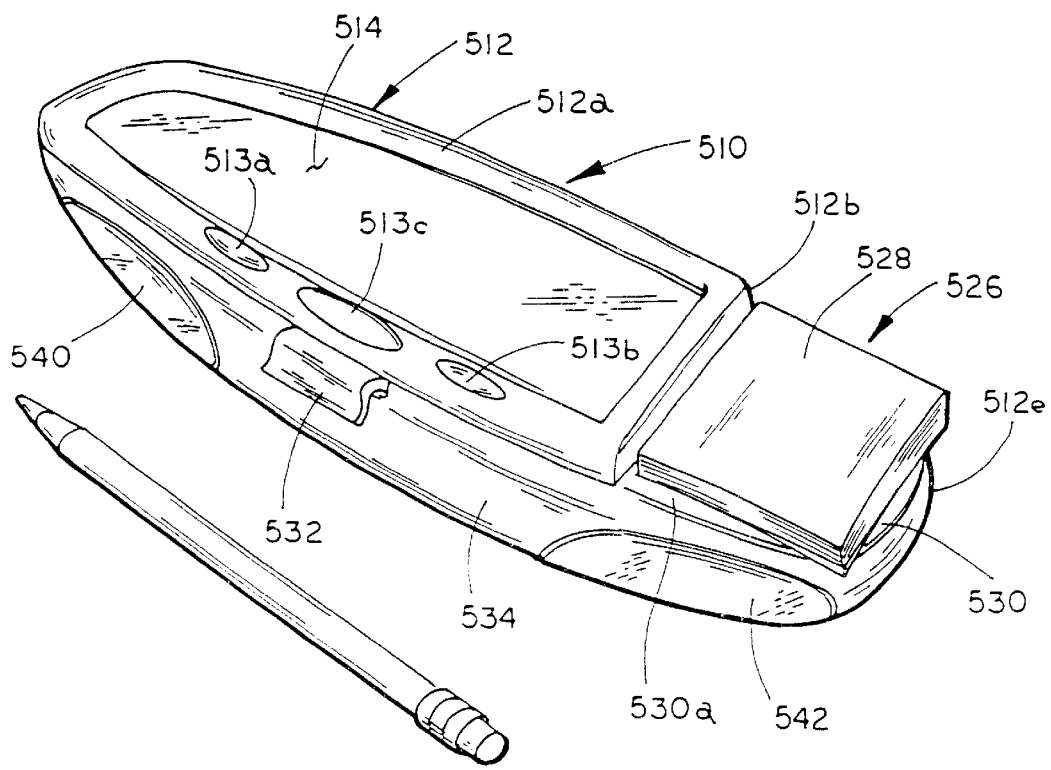
FIG. 20 is a bottom perspective view of a sixth embodiment of the mirror assembly of FIG. 1 illustrating a work piece holder and a writing pad holder incorporated into the housing of the rearview mirror assembly and, further, with two map or dash board light assemblies.

A sixth embodiment 510 of the interior rearview mirror assembly of the present invention is illustrated in FIG. 20. Rearview mirror assembly 510 includes a mirror casing or housing 512, with a retaining rim or bezel 512a, and a reflective element 514, similar to the previous embodiments. Housing 512 may be mounted to the vehicle windshield, headliner or the like as described in reference to housing 12. Bezel 512a extends around the peripheral portion reflective element 514 and optionally includes buttons 513a, indicators 513b, or displays 513c which are commonly known in the art. Similar to the previous embodiment, rearview mirror assembly 510 includes a storage space 526 for supporting an accessory, such as a writing pad 528, a pager, or the like thereon. Storage space 526 is formed on a front side 530 of housing 512 and is preferably formed by a planar surface 530a adjacent bezel 512a. Bezel 512a includes a planar segment 512b which terminates along with reflective element 514 inwardly of peripheral portion 512e of housing 512. In this manner, pad 528 may lay substantially flush with bezel 512a to reduce the visual impact of the pad to the driver thereby minimizing the distraction to the driver. Pad 528 may comprise, for example a sticky note pad, and, therefore, be adhered to planar surface 530a by the adhesive provided on the back of most conventional sticky note pads. Alternately, surface 530 may include Velcro or a clip or other retaining structure to secure pad 528 to surface 530a, some examples of which are described in reference to the embodiment shown in FIGS. 19 and 24. Furthermore, housing 512 may include a recess behind planar surface to receive clips' of a pager or the like.

Optionally positioned below the chin area of bezel 512a is another storage space provided by an accessory attachment member 532, such as a work piece or writing instrument holder, such as a clip. For example, such a clip preferably positively grips the accessory, such as the pen or pencil, typically by spring tension action or the like between pliant fingers or arms, such that the accessory, such as a pen is readily insertable and detachable/removable from the accessory attachment member. Attachment member 532 may hold a pencil or pen, or alternately another elongated item such as a pen-type flashlight, a tire pressure gauge, or the like. Attachment member 532 may be secured to housing 512 by an adhesive, Velcro, or other fastening means. Preferably, attachment member 532 is plastic and is molded with a lower wall 534 of housing 512. Attachment member 532 lays generally flat and aligns with top surface 530 of housing 512 to minimize the protrusion and, therefore, the distraction to the driver.

In addition, housing 512 may support one or more map illuminating or dashboard illuminating lights 540 and 542, for example the lights disclosed in U.S. Pat. No. 5,820,245, which is incorporated by reference herein in its entirety.

Figure 21:
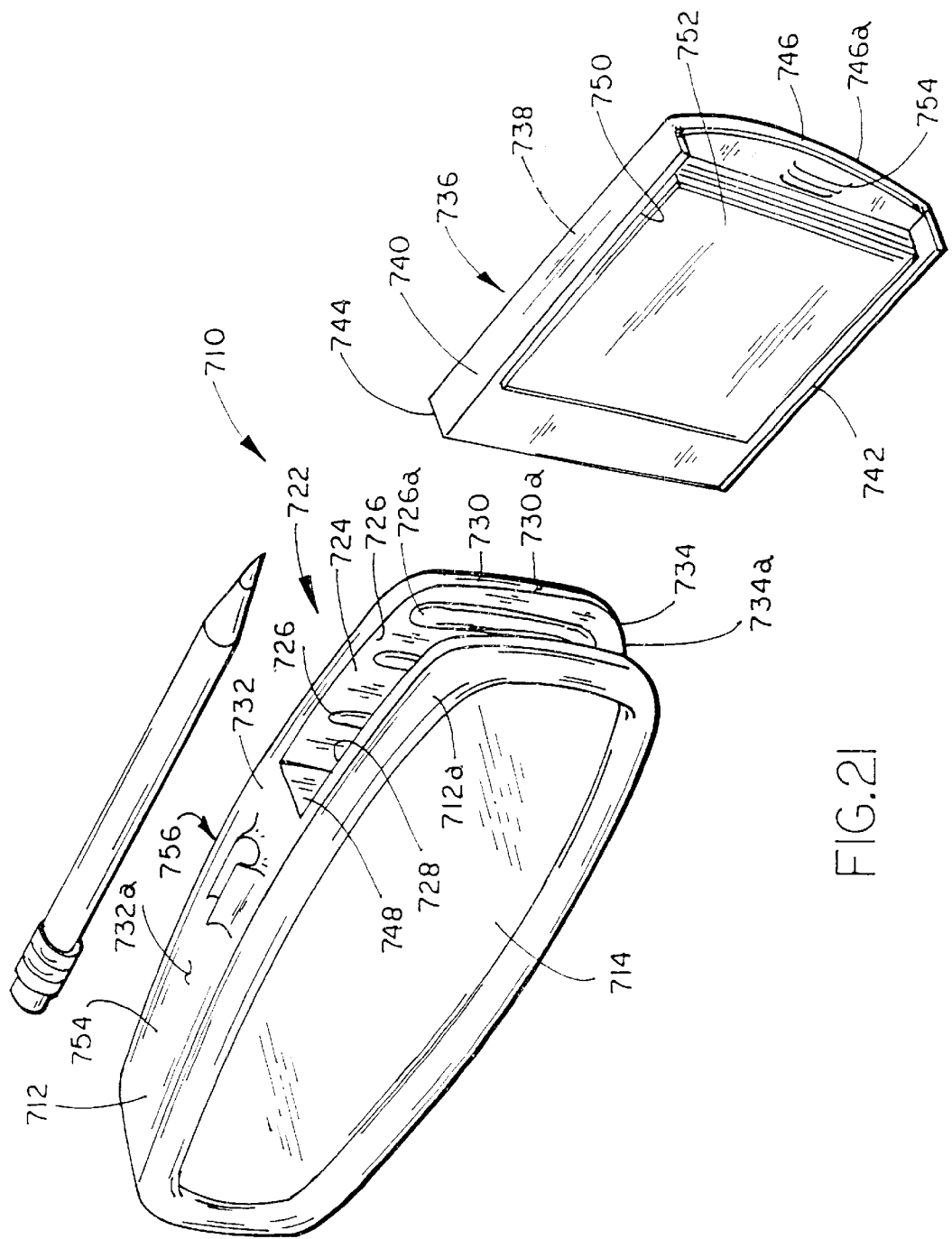
FIG. 21 is a front exploded perspective view of a seventh embodiment of a mirror assembly similar to FIG. 1 illustrating a slotted storage space for holding an accessory holder, such as a writing pad holder.

Referring to FIG. 21, a seventh embodiment 710 of the interior rearview mirror assembly of the present invention is illustrated. Mirror assembly 710 includes a mirror casing or housing 712, a retaining rim or bezel 712a, and a reflective element 714. Reference is made to the first embodiment for description of the housing and bezel material, and reflective element 714 and, further, for preferred mounting arrangements of housing 712 to the vehicle. In the illustrated embodiment, housing 712 includes a storage space 722 which is defined by a slotted recessed portion 724, which extends into housing 712 from end wall 730 of housing 712. Recessed portion 724 is formed between opposed walls 726 and 728 and extends between upper wall 732 and lower wall 734 of housing 712 to define a receptacle for an accessory holder 736. Accessory holder 736 may support or hold a plurality of accessories, including for example, cards, paper work, such as insurance or registration papers, writing pads, maps, and the like. In the illustrated embodiment, accessory holder 736 comprises a writing pad holder and includes a molded body 738 having upper and lower walls 740 and 742 which align and follow the contour of housing 712. In most preferred form, walls 740 and 742 are flush with outer surface 732a, 734a of upper and lower walls 732 and 734, respectively, when holder 736 is inserted into recess 724. Body 738 also includes an end wall 744 and a back wall 746, with end wall 744 abutting an inner wall 748 of recess 724 when holder 736 is fully inserted into recess 724. Distal edge 746a of back wall 746 also preferably follows the contour of housing 712 and, most preferably, is generally flush with outer surface 730a of end wall 730 of housing 712 when holder 736 is inserted into storage space 722.

Back wall 746 defines a storage space 750 between end wall 744 and upper and lower walls 740 and 742, which is preferably sized to hold a writing pad 752, such as a sticky note pad. Pad 752 may be held in place by the adhesive back, Velcro, or may be held in place by friction between the edges of pad 752 and upper and lower walls 740 and 742. In addition, back wall 746 preferably includes a gripping surface 754 to permit tactile identification of holder 736 by the driver of the vehicle, thus minimizing the distraction to the driver. For example, gripping surface 754 may comprise one or more projecting ribs or recessed grooves. In addition, gripping surfaces 754 provides improved gripping of body 738. In this manner, body 738 can be grabbed without requiring the operator of the vehicle to take his or her eyes off the front of the vehicle.

Holder 736 is held in recess 724 preferably by friction. For example, as shown in the illustrated embodiment, side wall 726 includes a plurality of ribs 726a which project inwardly toward holder 736 to provide a frictional force between housing 712 and holder 736 (FIG. 21). Ribs 726a may comprise, for example resilient ribs, such as rubber ribs, to provide enhanced friction. Alternately, one or more walls 726 and 728 may support a spring for biasing holder against wall 726 or 728 for frictionally holding holder 736 in recess 724.

Housing 712 may optionally include a second storage space defined by an accessory attachment member 756 which is preferably molded to upper housing wall 732. Optionally, attachment member 756 may be separately formed and adhered to upper wall 732 by an adhesive, Velcro or other fastening means. Attachment member 756 includes resilient arms which form a clip and provides a convenient location for storing a tool or work piece, such as a pencil or pen, which can be easily retrieved by an occupant of the vehicle for use with pad 752. It should be understood that attachment member 756 may be located, for example, below bezel 712a in the chin area of mirror casing 712, or on forward facing side or rear wall 754 of housing 712, or on an end wall of housing 712.

Figure 22:
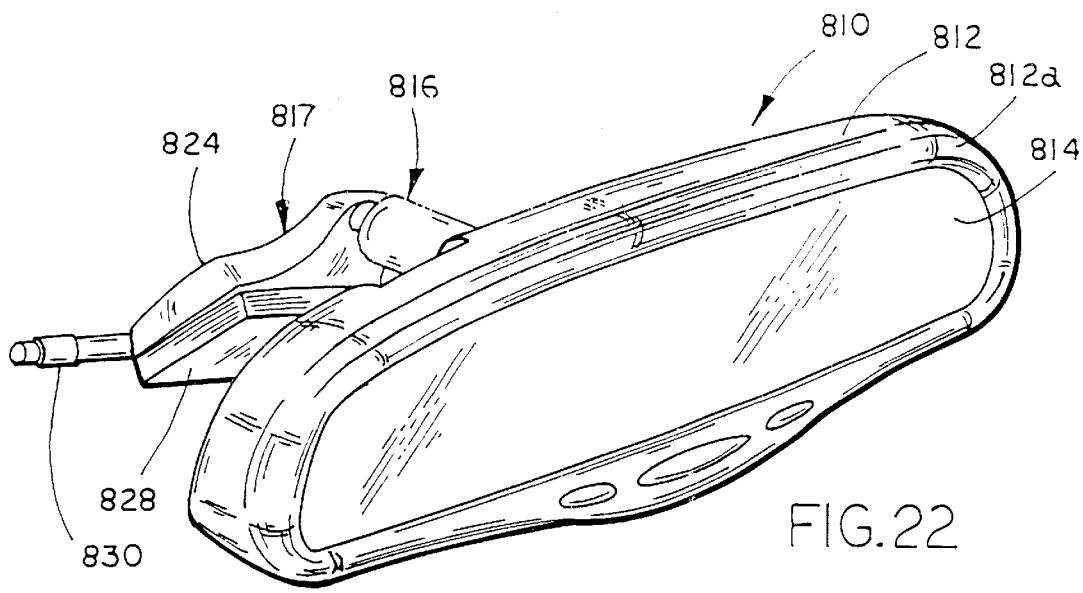
FIG. 22 is a perspective view of an eighth embodiment of the interior rearview mirror assembly incorporating a pad and pencil holder into a mirror mounting bracket.

Referring to FIG. 22, a ninth embodiment 810 of the interior rearview mirror assembly of the present invention is illustrated. Rearview mirror assembly 810 includes a mirror housing 812, a bezel 812a, and a reflective element assembly 814, similar to the previous embodiments. In the illustrated embodiment, housing 812 is supported by a support arm 816 with a modified break-away mounting bracket or mirror mount 817. In the illustrated embodiment, support arm 816 includes a pair of ball mounts 824a and 824b for extending into a receiving socket on housing 812 and into a receiving socket in bracket 817.

Figure 23:
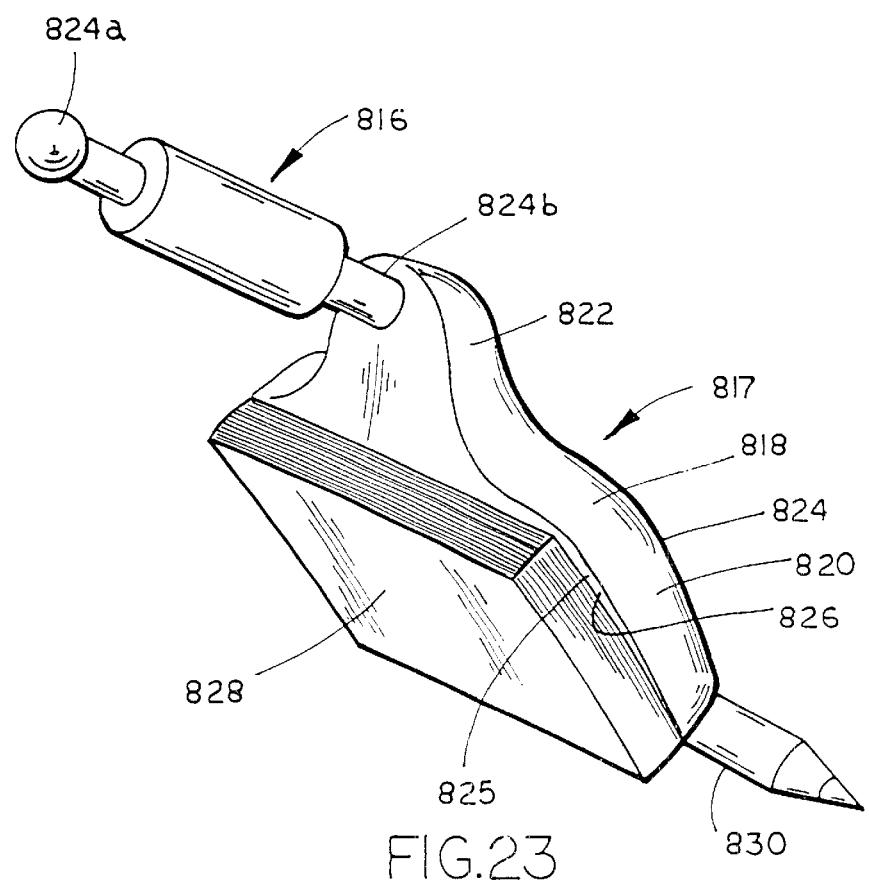
FIG. 23 is a perspective view of the paper and pencil holder of FIG. 22.

As best seen in FIG. 23, break-away mounting bracket 817 includes a body 818 with a generally planar base portion 820 and an upwardly extending tapered portion 822 having a spherical socket or receptacle into which ball mount 824b projects to permit repositioning of interior mirror housing 812 about bracket 817. Body 818 includes a windshield facing side 824, which is configured to releasably mount to a conventional windshield mounted button, for example, a button as described in U.S. Pat. No. 5,820,097, the disclosure of which is incorporated by reference herein. Body 818 further includes a rearward facing planar surface 825 which defines a storage surface 826 for storing an accessory, such as a writing pad 828, such as a sticky note pad. In this manner, when assembly 810 is mounted to a vehicle windshield or headliner, pad 828 is easily accessible by the driver or occupant of the vehicle and, furthermore, is located in a known location that does not obstruct the driver's view. Preferably, pad 828 is adhered to planar surface 825 by the adhesive provided on most conventional sticky note pads. Alternately, pad 828 may be mounted by Velcro or may include a stiff backing member, for inserting into a corresponding receiving structure provided on planar surface 825, as will be understood by those skilled in the art.

In addition, body 818 preferably includes another storage space provided by an accessory attachment member similar to that shown at 440, 532 or 756 above, or one or more tubular members formed on bottom wall 818a of body 818 for holding a tool or work piece 830, such as a writing instrument, for example a pen or pencil or the like. Preferably, such attachment members are integrally molded with body 818; however, it can be appreciated that the attachment member may be adhered to body 818 by a suitable adhesive or fasteners. Reference is made to the previous embodiments for examples of suitable attachment members, such as clips or work piece holders. It should be understood from the foregoing, that pad 828 and pencil 830 are conveniently placed behind the rearview mirror housing 812 and thus do not obstruct the view of the driver of the vehicle. Furthermore, by positioning pad 828 and pencil 830 on the mirror mounting bracket, minimal, if any, distraction is required to access or to retrieve the pad or pencil since the pad and pencil are located in a known location in the vehicle.

Figure 24:
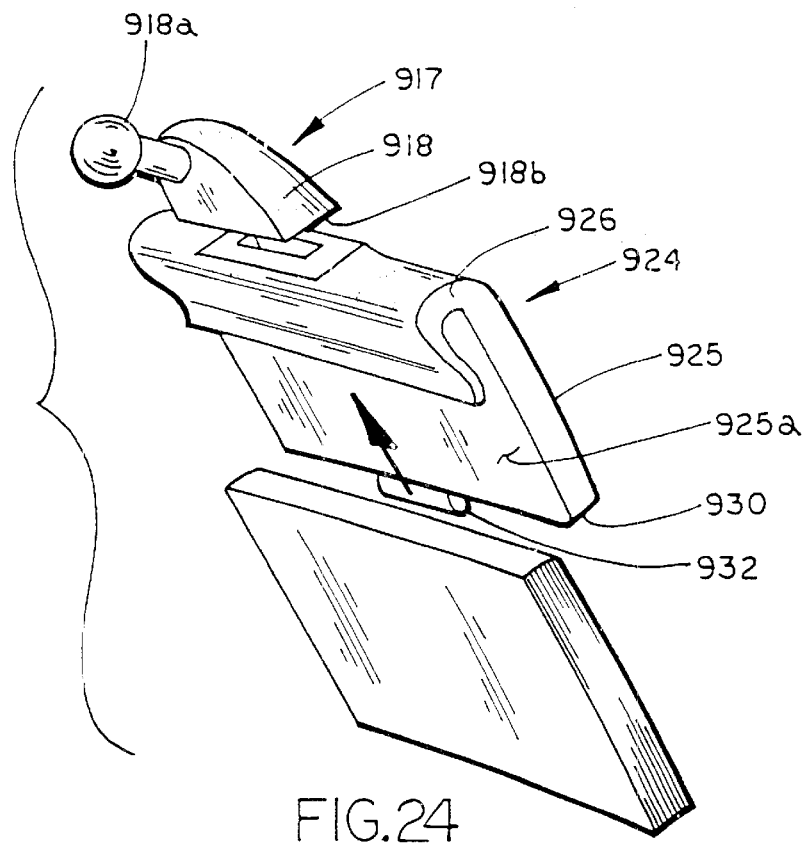
FIG. 24 is an exploded perspective view of a second embodiment of the paper and pencil holder.

Referring to FIG. 24, a second embodiment 917 of a mirror mounting bracket or mirror mount is illustrated. Mirror mounting bracket 917 may be used in conjunction with any one of the illustrated embodiments of the interior rearview mirror assemblies and further with other interior rearview mirror assemblies. Mirror mounting bracket 917 includes a body 918 which supports a ball member 918a and is adapted to provide a break-away mount to a conventional windshield mounted button, as described in reference to the previous embodiment. Ball member 918a is engaged by a support arm (not shown) similar to support arm 16. Extending from a lower end 918b of body 918 is a storage space provided by a pendent accessory holder 924, such as a note pad holder, a map holder, or a holder for other generally flat accessories, for example a writing pad, a plastic card, such as a credit card, an access card or a toll card, or the like. Holder 924 includes a body with a planar portion 925 and an accessory attachment member 926, such as a clip, formed at an upper end of planar portion 925 which projects downwardly and together with planar surface 925a of planar portion 925 forms a storage space for supporting an accessory.

Holder 924 may be mounted to telescope from bracket 917. For example, holder 924 may be mounted on a telescoping member or jack action or the like, or move down to an extended position below the mirror casing and then retract for storage. When holder 924 is extended down, holder 924 may include a foldable support or finger, which can be selectively moved to extend from the windshield facing side of holder 924 to touch the window to provide support when holder 924 is in its extended position. Optionally, holder 924 may be pivotally mounted to the mirror mounting bracket for reorienting toward the driver or other occupants of the vehicle. In addition, accessory attachment member 926 can be located elsewhere on the mirror assembly. For example, attachment member 926 may be located on the mirror case, such as on the rear wall or forward facing side of the casing. By providing spring-loaded gripping fingers to the pendent accessory, a map can be held below the mirror assembly when mounted in the vehicle in a position readily viewable by the driver.

Optionally, holder 924 may be integrally molded with body 918 of mirror mounting bracket 917. However, it can be appreciated that holder 924 may be secured to bottom surface 918a of body 918 by an adhesive or other suitable fastening means. Preferably mounted to a lower end 930 of planar portion 925 is a second storage space provided by a second accessory attachment member 932, such as a work piece attachment member, for example a clip which positively holds the accessory, for example by tension between two flexible fingers or arms or the like. Attachment member 932 may comprise an integrally molded member having a generally C-shaped cross section similar to attachment member 756 described in reference to FIG. 21 or include a J-shaped body similar to attachment member 532 illustrated in FIG. 20. Alternately, attachment member 932 may comprise a tubular member with an elongated cylindrical passage for holding a work piece or a pair of cylindrical or ring shaped members, which are aligned to define a pair of spaced apart support surfaces for a work piece, such as a pencil, pen, pressure gauge, pen-light or the like, such as those shown at 440, 532 or 756 above.

Figure 25:
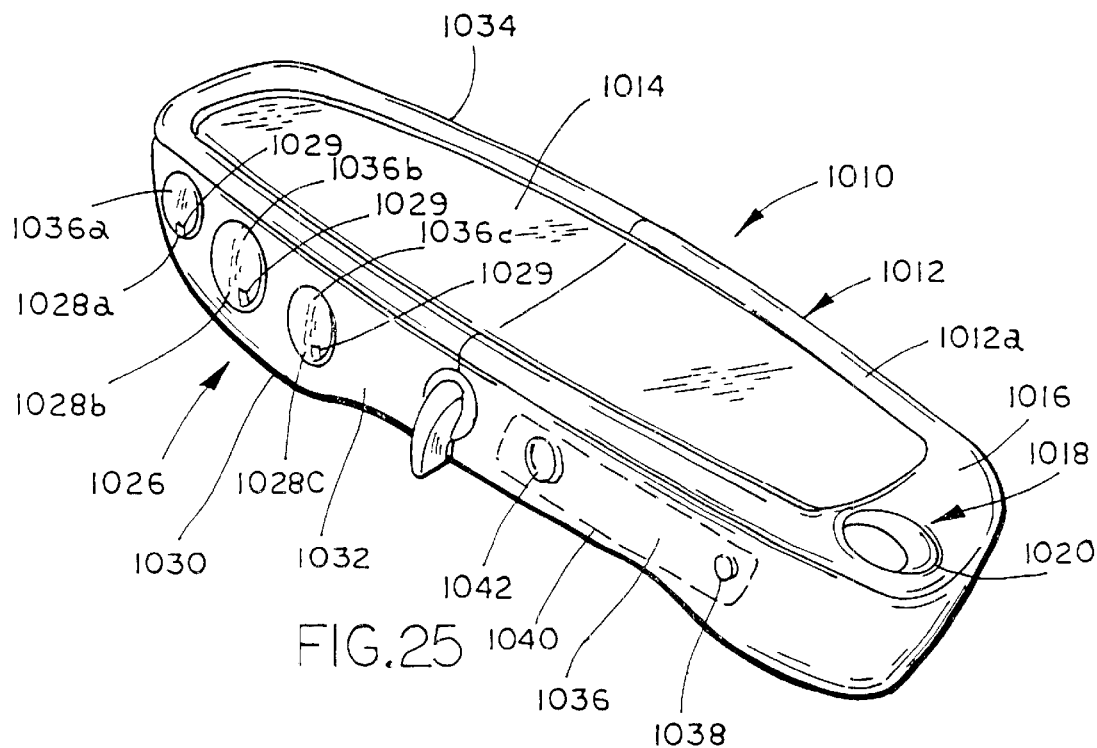
FIG. 25 is a bottom perspective view of a ninth embodiment of the rearview mirror assembly of the present invention illustrating a storage space for holding and dispensing coins, a 12-volt supply, and an air freshener dispenser.

A tenth embodiment 1010 of an interior rearview mirror assembly of the present invention is illustrated in FIG. 25. Rearview mirror assembly 1010 includes a mirror casing or housing 1012, a bezel 1012a and a reflective element 1014. Reference is made to the first embodiment for suitable materials for housing 1012 and bezel 1012a and a description of reflective element 1014. Bezel 1012a extends around the peripheral portion of reflective element 1014 and includes an enlarged side area 1016, which provides a location for a power supply connection 1018, for example a 12-volt power supply connection. Similar to conventional power supplies provided in dashboards or consoles of most conventional vehicles, power supply connection 1018 includes a cylindrical casing 1020 which extends into assembly 1010 through bezel 1016. The contacts for the power supply (not shown) are coupled to the vehicle electrical system by way of wiring which extends through housing and exits housing 1012 preferably through mirror mount (not shown), which may be of similar construction to the ball mount illustrated in FIG. 6 of the first embodiment. In this manner, accessories, such as radar detectors or the like, may be plugged into the interior rearview mirror assembly 1010 thus reducing the length of wire required for the radar detector to reach most conventional power supplies and further reducing the distraction of dangling wires associated with conventional radar detectors.

In addition, housing 1012 includes a storage space 1026 in the form of one or more coin holders 1028a, 1028b, and 1028c. Coin holders 1028a, 1028b, and 1028c comprise cylindrical members of different sizes or diameters which extend into housing 1012 rearward of reflective element assembly 1014. Each coin holder 1028a, 1028b, and 1028c includes an associated release mechanism for releasing coins held in the respective holder. Preferably, the release mechanism is accessible from the forward facing side or rear wall 1030 of housing 1012, which is easily accessible by the driver of the vehicle. In one form, each coin holder includes cylindrical members which extend from a lower wall 1032 of mirror housing 1012 to an upper wall 1034 so that coins may be loaded into their respective coin holders through the upper wall 1032 of housing 1012. In order to maximize the number of coins held in the respective coin holders, each latch 1029 is preferably located in close proximity to lower openings 1036a, 1036b, 1036c of each respective coin holder. In one form, latches 1029 comprise spring biased members which block openings 1036a, 1036b, 1036c to prevent the coins held therein from being released through the bottom openings of each respective holder until such a time that the respective latch is released from its extended position by the operator of the vehicle.

In preferred form, housing 1012 includes a second storage space 1036 inside housing 1012. Storage space 1036 may support a supply of facial tissue, wipes, a tape dispenser, or a supply of air freshener. The tissue, wipe, tape, or air freshener is removed or ejected from housing 1012 through an opening 1038 provided in bottom wall 1032 of housing 1012. For example, the supply of air freshener may be provided by an aerosol container or cartridge 1040 which is supported on and mounted to lower wall 1032 by one or more retainers, such as clips, which may be formed on the interior of housing 1012. To minimize noise and induced vibration, preferably the cartridge of the air freshener supply is rigidly mounted to housing wall 1032. Also, optionally provided on bottom wall 1032 is an actuator 1042, such as a button, which releases the air freshener from container 1040 through opening 1038.

Moreover, a vehicle cabin air monitor can be incorporated into mirror assembly 10 such as within housing 1012, that includes reflective element 1014, or in a pod or housing that attaches to the mirror mount. Reference is made to copending application Ser. No. 09/244,726, which is incorporated herein by reference in its entirety, for an example of a suitable pod. For example, levels of carbon monoxide may be monitored by such air monitors provided at the mirror location. Preferably, the air monitor includes an intake, preferably a fan assisted intake that samples the air within the cabin. In preferred form, when the vehicle level of carbon monoxide exceeds a threshold level, the monitor takes appropriate action, for example sounding an alarm, shutting off the engine, and/or opening windows. Such an air monitoring system is preferably used with a remote ignition system such as is commonly used in cold climates when the engine is started up remotely. Such a vehicle air monitoring system protects against the build up of carbon monoxide within the vehicle cabin.

Figure 26:
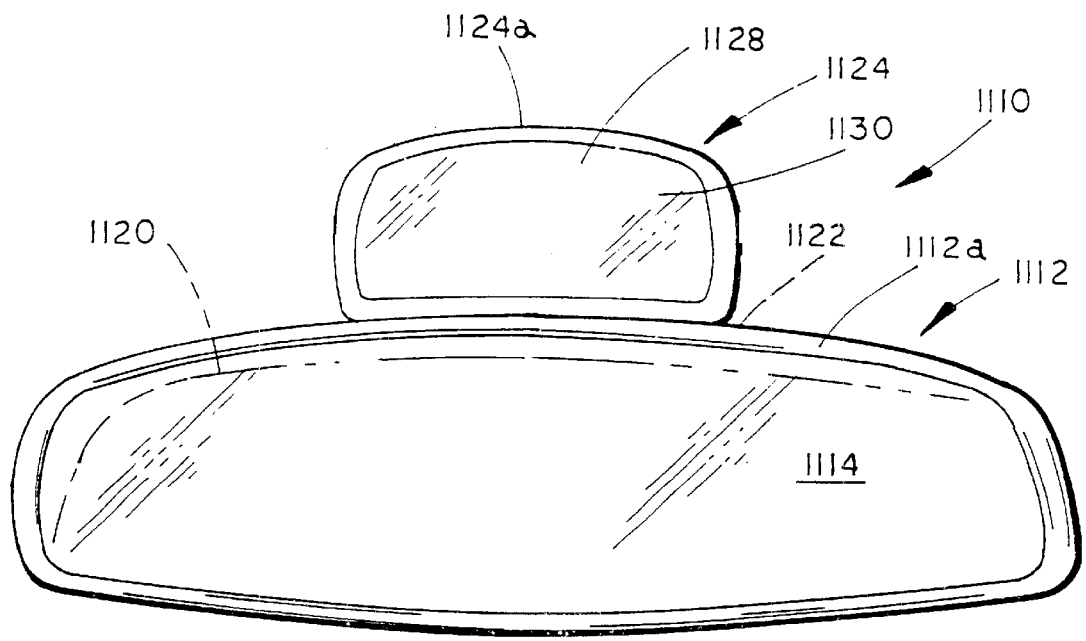
FIG. 26 is a front view of another embodiment of the interior rearview mirror assembly illustrated in FIGS. 1–8.
Figure 27:
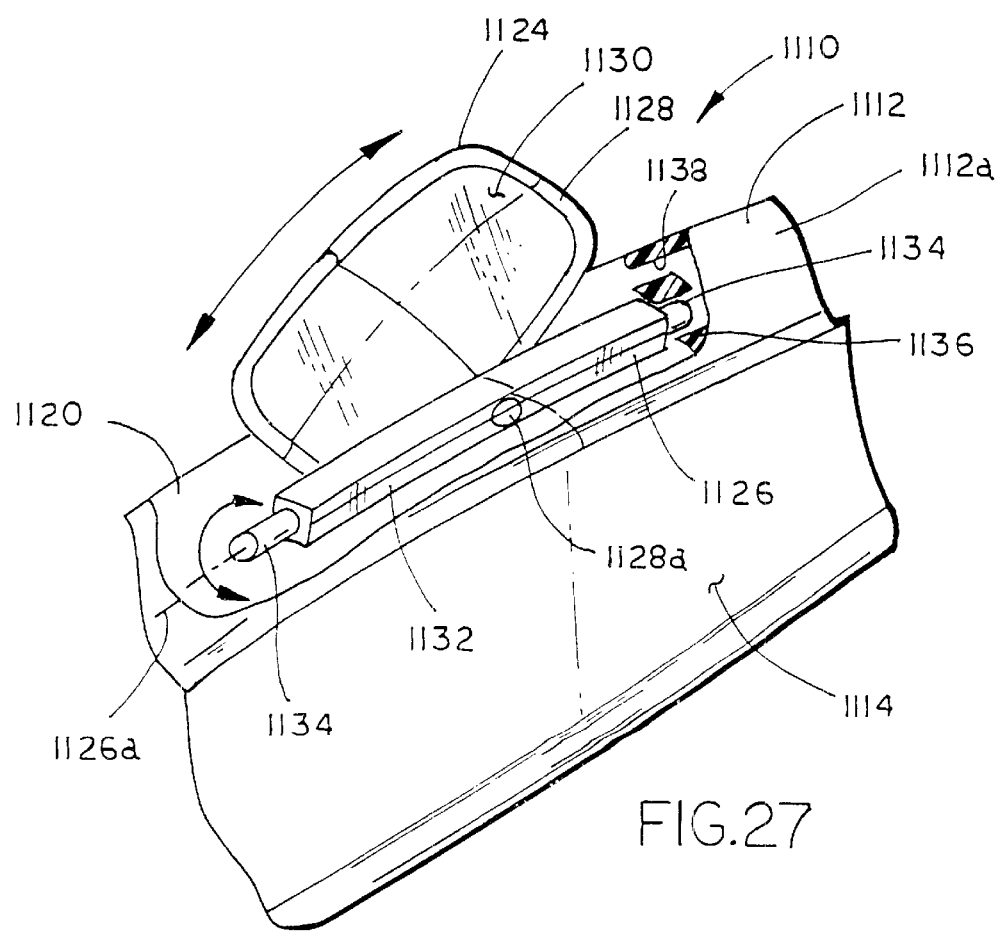
FIG. 27 is a top perspective partial fragmentary view of the interior rearview mirror assembly of FIG. 26.

Referring to FIGS. 26 and 27, the numeral 1110 generally designates a second embodiment of the mirror assembly illustrated in FIGS. 1–8. Mirror assembly 1110 includes a housing or casing 1112, a reflective element 1114, and a storage space 1120. Storage space 1120 comprises a cavity formed in casing 1112 for housing an accessory 1124. Similar to accessory 24, accessory 1124 may comprise a vanity mirror or a display device, including a video display device as described in reference to the first embodiment. For further details of casing 1112, reflective element 1114, and other electrical and electronic devices which may be housed in casing 1112, reference is made to assembly 10.

Accessory 1124 is mounted within cavity 1120 of mirror housing 1112 for movement between a retracted position and an extended position, as shown in FIG. 26. Preferably, when in its retracted position, accessory 1124 is substantially contained in cavity 1120 and, most preferably, such that accessory 1124 is completely contained in cavity 1120 so that accessory 1124 does not project from casing 1112 and potentially creates a distraction to the driver of the vehicle.

Referring to FIG. 27, accessory 1124 is mounted interiorly of casing 1112 in cavity 1120 by a pivot member 1126. Pivot member 1126 permits accessory 1124 to be moved between its retracted position within casing 1112 and its extended position by pivoting about a pivot axis 1126a. In the illustrated embodiment, pivot member 1126 includes an elongate body 1132 with opposed support pins 1134 which are pivotally mounted in support members 1136, such as flanges, provided in casing 1112. Preferably, support members 1136 comprise flanges which project downwardly from upper wall 1112a of casing 1112 and which space support pins 1134 inwardly from rear wall 1138 so as to permit accessory 1124 to pivot to its retracted position within casing 1112 between back wall 1138 and reflective element 1114. It should be understood, that support members 1136 may extend to rear wall or may include reinforcing ribs or webs which extend to rear wall 1138 to provide stiffness to support members 1136.

Accessory 1124 is pivotally mounted to pivot member 1126 about a pivot axis 1128a to permit repositioning of accessory 1124 about a generally vertical axis when accessory 1124 is moved to its extended position such as illustrated in FIG. 26. In this manner, once accessory 1124 is moved or pivoted to its extended position outside casing 1112, the position of accessory 1124 may be easily adjusted by an occupant of the vehicle, for example the driver or a passenger of the vehicle.

As noted above and described in reference to the first embodiment of the interior rearview mirror assembly of the present invention, accessory 1124 may comprise a vanity mirror or may comprise a display device. In preferred form, accessory 1124 includes a housing 1128 in which an element 1130, such as a reflective element or display element, is supported. Housing 1128 may include a ball mount to pivotally mount housing 1128 to pivot member 1126 or may include a socket to receive a ball mount provided on pivot member 1126 to permit accessory 1124 to tilt about the horizontal axis as well. Alternately, housing 1128 may be pivotally mounted by a pivot pin which generally permits rotation of housing 1128 and element 1130 only about axis 1128a.

As best understood from FIG. 27, when accessory 1124 is pivoted on pivot member 1126 about pivot access 1126a and generally aligned with pivot member 1126 along axis 1126a, accessory 1124 can then be retracted into cavity 1120 behind reflective element 1114.

Figures 28, 29:
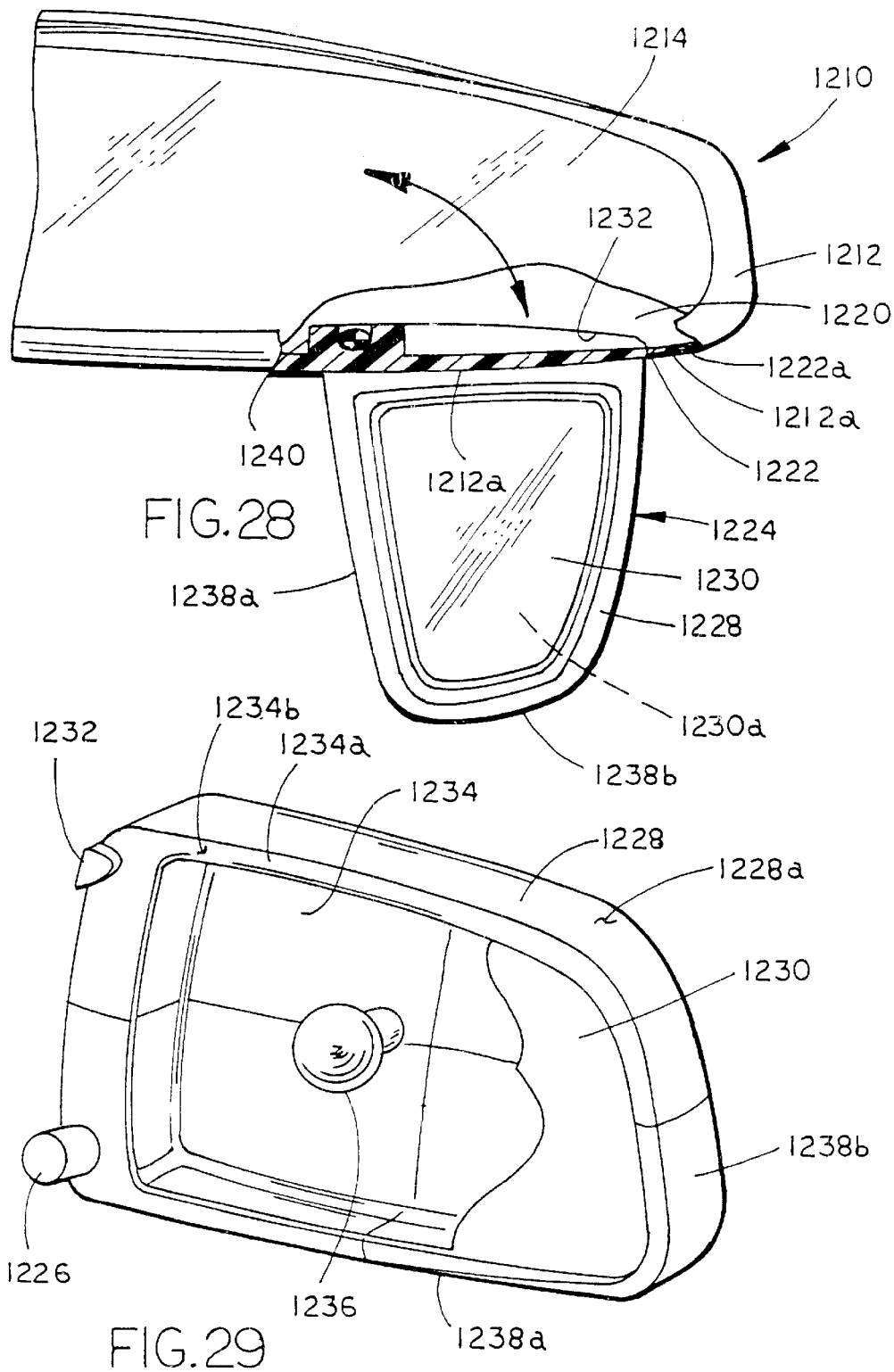
FIG. 28 is a partial front view of a third embodiment of the interior rearview mirror assembly illustrated in FIGS. 1–8 illustrating a pivotally mounted pendent accessory.
FIG. 29 is an enlarged perspective view of the pendent accessory housing of FIG. 28.

A third embodiment 1210 of the interior rearview mirror assembly illustrated in FIGS. 1–8 is shown in FIGS. 28 and 29. Mirror assembly 1210 includes a mirror casing 1212, a reflective element 1214, which is supported in casing 1212, and a storage space 1222. Housed in storage space 1222, is a pendent accessory 1224. As described in reference to accessory 24, accessory 1224 may comprise a vanity mirror or a display device. For further details of description of housing 1212, reflective element 1214, and components optionally supported in casing 1212, and variation of accessory 1124 reference is made to assembly 10.

In the illustrated embodiment, storage space 1222 comprises a cavity 1222a which extends into casing 1112 through an opening formed or provided in bottom wall 1112a. Cavity 1222a is preferably formed by molding and extends behind reflective element 1114 into casing 1112. Accessory 1224 is pivotally mounted in cavity 1222a by a pivot member 1226 as will be more fully described below, so that accessory 1224 can be moved between an extended position for viewing by an occupant of the vehicle (shown in FIG. 23) or a retracted or storage position within storage space 1222. Preferably, when in its storage position, accessory 1224 is substantially contained within storage space 1222 and, most preferably, completely contained and retracted into storage space 1222.

Accessory 1224 includes a housing 1228 and an element 1230, such as a reflective element or a display element. Reference is made to element 30 for examples and further description of element 1230. Preferably, housing 1228 includes a body 1228a with a recessed central portion or recessed wall 1234 which defines a perimeter wall 1234a. Element 1230 is supported in recessed portion 1234 and preferably mounted for pivotal movement in recessed portion 1234 so that the orientation of element 1230 can be adjusted by an occupant of the vehicle. Preferably, element 1230 is mounted to permit manual adjustment of element 1230; however, it should be understood that remote adjustment can be provided by an actuator, such as an electronic actuator, which are well known in the art. In the illustrated embodiment, recessed portion 1234 includes a ball mount 1236 which projects outwardly and on which element 1230 is mounted by a socket member which is provided on rear surface 1230a of element 1230. The ball and socket arrangement provides for pivotal movement of element 1230 about horizontal and vertical axes. Preferably, when mounted on ball mount 1236, element 1230 generally lies in the same plane as upper surface 1234b of perimeter wall 1234a when in a non-tilted position so that element 1230 will not project outwardly from housing 1228 so that housing 1228 can be quickly and easily pivoted to its retracted position within storage space 1222. As would be understood by those skilled in the art, element 1230 may alternately include a ball mount mounted to its rear surface 1230a with recessed portion 1234 having a socket member for receiving the ball mount of element 1230.

Referring to FIG. 29, at least lower edge 1238a and side edge 1238b of housing 1228 preferably follow the contours of casing 1212 so that when retracted, housing 1228 generally follows the contour of casing 1212. Moreover, housing 1228 is preferably the same size as the opening to cavity 1222 sot that when retracted, housing 1228 appears to be a unitary part of the mirror.

Referring to FIG. 29, housing 1228 supports pivot member 1226 and preferably includes a stop 1232 which is spaced from pivot member 1226 and limits rotation of housing 1228 about pivot member 1226 by engaging bottom wall 1212a of casing 1212 (as shown in FIG. 28). In preferred form, as previously noted, housing 1228 is commensurate in size with the opening or mouth of cavity 1222a so that when retracted, the lower surface 1224a of accessory 1224 follows casing 1212 and forms a unitary part of mirror assembly 1210. Pivot member 1226 is mounted in case 1212 on a support member, such as a support flange 1240, which is formed or otherwise provided on bottom wall 1212a of casing 1212. Accessory 1224 is mounted for pivotal movement on support member 1248 by pivot member 1226 which is preferably journaled in member 1240. In preferred form, when fully retracted into storage space 1222, accessory 1224 does not provide any obstruction to the driver's view through the front windshield of the vehicle; instead, accessory 1224 is preferably substantially hidden from view when retracted. When extended from casing 1212, accessory 1224 projects downwardly from bottom wall 1212a to provide, for example a vanity mirror or a display member including a video display, as previously noted with the orientation of element 1230 within housing 1228 being preferably manually adjustable by an occupant of the vehicle, including the driver.

As described in reference to the previous embodiments, element 1230 may comprise a reflective element, including a flat reflector, a reflector having a compound curvature, an aspheric or convex mirror reflector, or may comprise a display screen for displaying information, such as vehicle status, a rearview vision system, or a baby minder system as previously described. In addition, housing 1228 may support a plurality of light sources, such as incandescent light sources or non-incandescent light sources, such as LEDs, around element 1220 to provide a vanity mirror.

Referring to FIG. 30, a second embodiment 1310 of the interior rearview mirror assembly illustrated in FIGS. 15, 15A, and 16 is shown. Mirror assembly 1310 includes a housing or casing 1312, a reflective element 1314, and support arm 1316, and mounting bracket 1317. It should be understood that other support arms and mounting arrangements may be used to mount assembly 1310 onto a vehicle headliner or windshield. Reference is made to assembly 210 for further description of casing 1312, reflective element 1314, support arm 1316, and bracket 1317. Similar to casing 212, upper wall 1312a of casing 1312 includes a storage space 1322 for supporting an accessory 1324. In the illustrated embodiment, accessory 1324 comprises a dispensing accessory for dispensing wipes, including "wet wipes" or glass cleaner wipes or the like, or tissues so that an occupant of the vehicle can easily and quickly retrieve a wipe or tissue T. Storage space 1322 may be provided by a recess, similar to recess 224, and by molding a recess into upper wall 1312a of casing 1312 or may be provided by an insert which is inserted into upper wall 1312a through an opening, similar to opening 222a.

Dispensing accessory 1324 includes a container 1326 with a dispensing opening 1328 through which a wipe or tissue T may be dispensed for use by an occupant of the vehicle. Housing 1326 is removably supported in storage space 1322 and may be releasably retained in storage space 1322 by a friction fit, snap couplers or may be held in place by one or more spring loaded latches 1330. As would be understood by those skilled in the art, spring loaded latches 1330 may frictionally engage an inner surface 1322a of storage space 1322 or may engage a corresponding recess provided on inner surface 1322a. In this manner, tissue or wipe dispensing accessory 1324 may be quickly and easily removed from storage space 1322 for refill or replacement. Optionally, additional storage space may be provided for discarded tissues or wipes. For example, storage space 1322 may be segregated into two storage spaces—one for holding the dispensing accessory, and the other for holding the discarded tissues, wipes, or other trash. Alternately, a disposal bin may be provided elsewhere in the vehicle.

It should be understood from the foregoing, that interior rearview mirror assembly 1310 provides a storage space 1322 which may be used to support a wide variety of accessories therein beside tissue dispenser 1324. Optionally, as previously noted, tissue dispensing assembly 1324 may be removed such that storage space 1322 may be used for storing other accessories, as described in reference to assembly 210.

Referring to FIG. 31, a second embodiment 1410 of the interior rearview mirror assembly illustrated in FIGS. 9–14 is shown. Mirror assembly 1410 includes a mirror housing or casing 1412, a reflective element 1414, and a storage space 1422 for storing a dockable accessory 1424, similar to assembly 110. As previously described, dockable accessory 1424 may comprise a light assembly (as shown), a telecommunication device, such as a phone or a pager, or other hand held electrical or electronic devices or the like. For further details of housing 1412, dockable accessory 1424, and reflective element 1414 general reference is made to assembly 110.

In the illustrated embodiment, dockable accessory 1424 includes a housing 1426 which includes a pair of spring loaded latches 1428 for engaging elongate recesses 1430 provided in back wall 1412a of casing 1412 in storage space 1422. Housing 1426 preferably supports a pair of latch releases 1432 which move latches 1428 between an insertion position and an engagement position. When moved to their insertion position, which is typically achieved when latch releases 1432 are compressed, latches 1428 can then be aligned for insertion into elongate recesses 1430. When latch releases 1432 are released, latches 1428 engage with casing 1412 in recessed 1430, as will be understood by those skilled in the art. Similar to the previous embodiment illustrated in FIGS. 9–14, housing 1412 preferably supports a pair of contacts 1432 which permit accessory 1424 to couple to either a recharging unit in mirror assembly 1410 or located elsewhere in the vehicle for recharging of dockable accessory 1424, as previously described in reference to assembly 110. Optionally, housing 1426 may support a pair of guide members 1444 which engage corresponding elongated recesses or slots 1446 provided in side wall 1448 of storage space 1422. In this manner, guide members 1444 guide dockable assembly 1424 into the correct position onto storage space 1422. Therefore, in order to dock accessory 1424 onto storage space 1422, latch releases 1432 must be compressed so that latch members 1428 are aligned for placement into elongated recesses 1430. When guide members 1444 properly aligned with recesses 1446, and latches 1428 are inserted into elongated recesses 1430, latch releases 1432 may be then released so that dockable accessory 1424 is releasably mounted to casing 1412.

Figure 32:
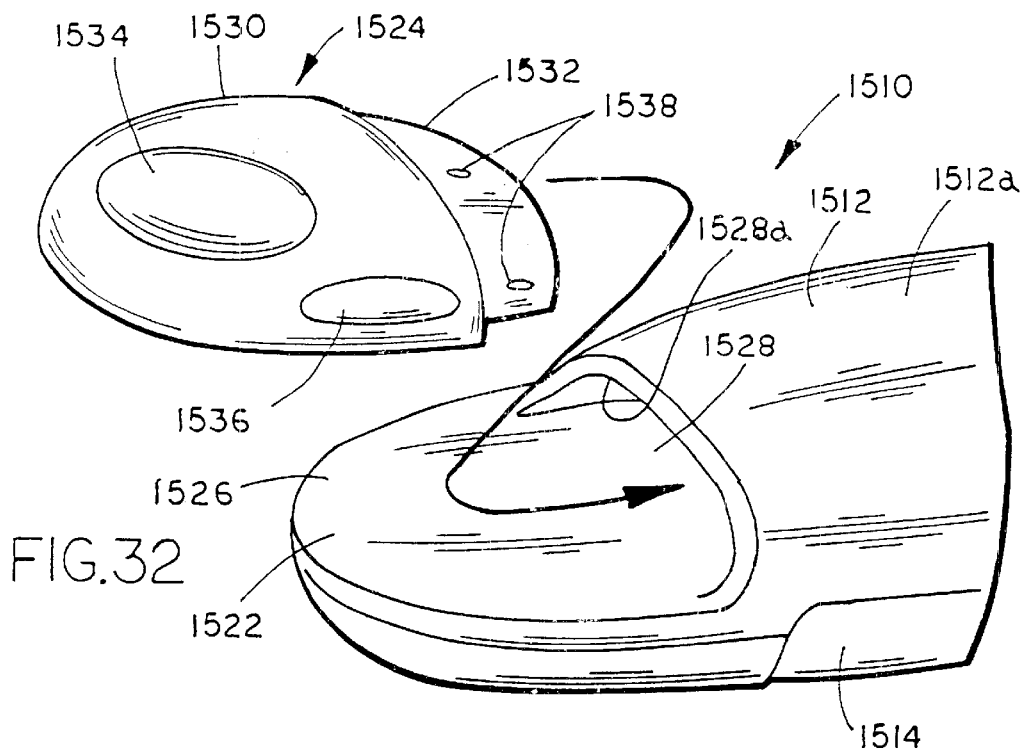
FIG. 32 is a partial rear exploded perspective view of a third embodiment of the interior rearview mirror assembly of FIGS. 9–14.

Referring to FIG. 32, a third embodiment 1510 of the interior rearview mirror assembly illustrated in FIGS. 9–14 is shown. Mirror assembly 1510 includes a mirror casing 1512, a reflective element 1514, and a storage space 1522, on which a dockable accessory 1524 is mounted for storage and later retrieval by an occupant of the vehicle, such as the driver. For further details of housing 1512, reflective element 1514, and dockable accessory 1524, reference is made to mirror assembly 110.

In the illustrated embodiment, storage space 1522 is formed by generally planar recessed wall 1526 provided on back wall 1512a of mirror case 1512 and a cavity 1528 which is formed in back wall 1512a. As noted in reference to accessory 24, accessory 1524 may comprise a light assembly, a telecommunications device, such as a telephone or pager or the like. Accessory 1524 includes a housing 1530 with a flange portion 1532. Flange 1532 is commensurate in size with cavity 1528 so that when flange 1532 is inserted into cavity 1528, accessory 1524 is held in storage space 1522 by the friction between flange 1532 and wall 1528a which defines cavity 1528 and wall 1526. Housing 1530 supports a cover or lens 1534 and includes at least one gripping surface 1536, similar to the dockable accessory described in reference to embodiment 110. Optionally mounted to flange 1532 are a pair of contacts 1538 which engage or make contact with a corresponding pair of contacts provided on cavity wall 1528a in cavity 1528. Thus, when accessory 1524 is docked onto storage space 1522, accessory 1524 is held in place by friction between flange 1532 and wall 1528a and is coupled to a recharger located either in casing 1512 or elsewhere in the vehicle to recharge batteries supported within housing 1530 of accessory 1524, as described in greater detail in reference to accessory 124.

Similar to the previous embodiments, housing 1530 and cover 1534 are preferably contoured to follow contour of casing 1512 such that when docked, accessory 1524 forms a unitary unit with casing 1512. It should be understood, that flange 1532 may be provided with releasable couplers, as snap fit flanges or the like which provide a positive engagement between flange 1532 and wall 1528a or wall 1526 as will be understood by those skilled in the art. In addition, flange 1532 may support releasable latches similar to latches 1428 described in reference to the previous embodiment.

Figure 33:
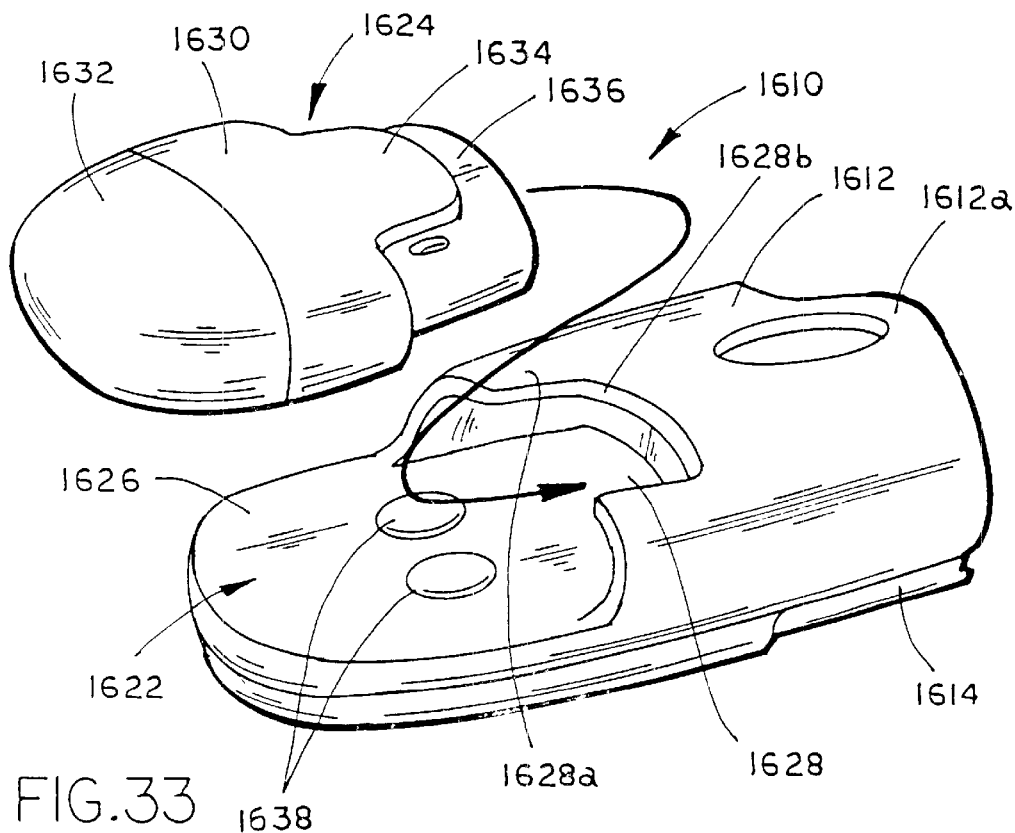
FIG. 33 is a partial rear exploded perspective view of a third embodiment of the mirror assembly FIGS. 9–14.

Referring to FIG. 33, the numeral 1610 generally designates a fourth embodiment of the interior rearview mirror assembly illustrated in FIGS. 9–14. Mirror assembly 1610 includes a mirror housing or casing 1612, reflective element 1614, and a storage space 1622 for storing a dockable accessory 1624, similar to the previous embodiment. As previously described, dockable accessory 1624 may comprise a light assembly (shown), a telecommunications device, such as a phone or a pager or other hand held electrical or electronic devices. For further details of housing 1612, reflective element 1614 and accessory 1624, general reference is made to assembly 110.

Storage space 1622 is formed by a generally planar wall 1626 formed on back wall 1612a of casing 1612 and a generally open cavity 1628 which is formed in back wall 1612a and has a generally U-shaped configuration. Cavity 1628 is defined between planar wall 1626 and a generally U-shaped retaining wall 1628a which extends over planar wall 1626. Accessory 1624 includes a housing 1630, which supports a cover or lens 1632, and a flange 1634 commensurate in shape with cavity 1628 so that when accessory 1624 is docked in storage space 1622, flange 1634 extends into cavity 1628 and is held in place by U-shaped wall 1628a. Preferably, accessory 1624 is held in storage space 1622 by frictionally engagement between flange 1634 and wall 1628a of cavity 1628 and planar wall 1626.

In order to follow the contours of casing 1612, housing 1630 preferably includes a projecting lip 1636 which extends over flange 1634 and is commensurate in shape with opening 1628b of cavity 1628 such that when accessory 1624 is docked into storage space 1622, housing 1620 abuts casing 1612 and generally follows the contours of casing 1612. In this manner, when docked, accessory 1624 forms a generally unitary assembly with casing 1612.

Optionally, housing 1630 or flange 1636 may support one or more latches for positively engaging casing 1612, as previously described. In preferred form, casing 1612 supports a pair of contacts 1638 in storage space 1622 which electrically couple and make contact with corresponding contacts provided on accessory 1624 so that accessory 1624 may be recharged while docked in storage space 1622, as previously described.

The present invention provides a cavity or pocket created in the mirror housing or case such as by molding. This cavity or pocket provides a storage compartment for accessories, such as sunglasses, coins, parking tokens, a tape dispenser, tissue or wipe dispensers, and the like. Thus, for example, the driver on exiting the vehicle can take off a pair of sunglasses and readily and conveniently store them by placing them into the pocket storage compartment in the interior mirror casing, where the accessory is supported or stored. By locating the storage space on or in the interior mirror assembly, a high mounted storage location is provided which is away from children or pets in the car and further, may also provide a storage location that is not readily visible from outside the vehicle, therefore, enhancing the vehicle security. Also, the present invention provides storage space on or within the mirror assembly that may be open storage insofar that no door hatch or latch is provided or required, an example of which is illustrated in FIGS. 9–16 and 19–24, or may be closed storage, accessible such as by a door, hatch, latch, slider, telescoping support or the like, such as illustrated in FIGS. 1–8 and 17–18. Further, storage space is provided on the exterior of the mirror casing (or optionally, elsewhere on the rearview mirror assembly such as on the mirror support arm or on the mirror mount) for objects such as writing instruments such as pens, pencils and the like. The driver or passenger can releasably attach, for example, a pencil to the clip provided on the mirror casing. This provides a location in the vehicle interior cabin where the driver or passengers can readily find a pencil or the like.

As would be understood by those skilled in the art, modifications can be made to the various components of the several embodiments described above without departure from the spirit of the present invention. For example, the mirror casing may include an elongated recess extending into the casing which provides storage space for a tool, such as a pressure gauge or screw driver or pocket knife, or work piece, such as a writing instrument or light pen. The storage space may comprise an open storage space in which articles are quickly insertable to or retractable from the storage space or a closed storage space, such as described in reference to mirror assembly 310, which is accessed through a door or hatch. The storage space may comprise an attachment member such as a clip for releasably retaining a writing instrument such as a pen, or the like, to the rearview mirror assembly such as to the mirror case, to the mirror bracket/mount or to the mirror support arm. The present invention provides one or more storage spaces for storing articles or accessories and is applicable to a wide variety of interior rearview mirrors including electrically operated compass mirrors such as disclosed in U.S. Pat. No. 5,253,109, electrically operated interior rearview mirrors incorporating map reading lights such as disclosed in U.S. Pat. Nos. 4,646,210; 4,733,336; 4,807,096; and 5,178,448; and electrically operated automatically dimming mirrors such as described in U.S. Pat. Nos. 4,793,690; 4,799,768; 4,886,960; and 5,193, 029, mirror assemblies incorporating GPS such as disclosed in patent application Ser. No. 08/569,851, filed Dec. 8, 1995, by Roger L. Veldman and Desmond O'Farrell for "A VEHICLE GLOBAL POSITIONING SYSTEM NAVIGATIONAL AID"; now U.S. Pat. No. 5,971,552; mirrors including head light controls, such as disclosed in U.S. patent application Ser. No. 08/621,863, filed Mar. 25, 1996, entitled "VEHICLE HEADLIGHT CONTROL USING IMAGING SENSOR"; now U.S. Pat. No. 5,796,094; mirrors incorporating displays, such as disclosed in U.S. patent application Ser. No. 09/244,726, filed Feb. 5, 1999, entitled "REARVIEW MIRROR ASSEMBLY INCORPORATING VEHICLE INFORMATION DISPLAY", now U.S. Pat. No. 6,172,613, and U.S. Pat. No. 5,530,240 for "DISPLAY FOR AUTOMATIC REARVIEW MIRROR"; mirrors incorporating blind spot detection systems, such as disclosed in U.S. Pat. No. 5,530,240; U.S. Pat. No. 5,576,687; and U.S. patent application Ser. No. 08/799,735, entitled "VEHICLE BLIND SPOT DETECTION AND DISPLAY SYSTEM", filed Feb. 12, 1997; and mirrors incorporating remote frame action systems, such as disclosed in U.S. patent application Ser. No. 09/057,428, filed Apr. 8, 1998, for "A VEHICLE MOUNTED REMOTE TRANSACTION INTERFACE SYSTEM"; now U.S. Pat. No. 6,158,655; and U.S. Pat. No. 5,798,575; all commonly assigned to Donnelly Corporation, Holland Mich. and the disclosures of which are herein incorporated by reference in their entireties.

Changes and modifications in the specifically described embodiments can be carried out without departing from the principles of the invention, which is intended to be limited only by the scope of the appended claims, as interpreted according to the principles of patent law.

We claim:

1. An interior rearview mirror assembly for a vehicle, said mirror assembly comprising:
    a support adapted for mounting said mirror assembly to one of a vehicle windshield and a vehicle header,
    a casing pivotally attaching to said support and including a rearward facing opening and a forward facing side;
    a reflective element positioned in said casing and supported in said rearward facing opening, said reflective element providing a rearward field of view for a driver of the vehicle when said mirror assembly is mounted to the one of a vehicle windshield and a vehicle header;
    an electrically operated assembly;
    said casing including a casing wall having an exterior surface with a recessed portion, said recessed portion providing storage capacity for said electrically operated assembly and for storing said electrically operated assembly in a location accessible by an occupant of the vehicle whereby said electrically operated assembly can be removably docked at said recessed portion for use by an occupant of the vehicle, said recessed portion including an accessory attachment member for releasably holding said electrically operated assembly, and said attachment member being provided on said forward facing side; and
    said electrically operated assembly having an exterior surface, said exterior surface of said electrically operated assembly generally following a contour of said exterior surface of said casing wall when said electrically operated assembly is positioned at said recessed portion whereby said electrically operated assembly forms a unitary assembly with said casing when said electrically operated assembly is mounted at said recessed portion.

2. An interior rearview mirror assembly for a vehicle, said mirror assembly comprising:
    a support adapted for mounting said mirror assembly to one of a vehicle windshield and a vehicle header,
    a casing pivotally attaching to said support;
    a reflective element positioned in said casing, said reflective element providing a rearward field of view for a driver of the vehicle when said mirror assembly is mounted to the one of a vehicle windshield and a vehicle header;
    an electrically operated assembly comprising a light assembly;
    said casing including a casing wall having an exterior surface with a recessed portion, said recessed portion providing storage capacity for said electrically operated assembly and for storing said electrically operated assembly in a location accessible by an occupant of the vehicle whereby said electrically operated assembly can be removably docked at said recessed portion for use by an occupant of the vehicle; and
    said electrically operated assembly having an exterior surface, said exterior surface of said electrically operated assembly generally following a contour of said exterior surface of said casing wall when said electrically operated assembly is positioned at said recessed portion whereby said electrically operated assembly forms a unitary assembly with said casing when said electrically operated assembly is mounted at said recessed portion.

3. The interior rearview mirror assembly according to claim 2, wherein said reflective element comprises a variable reflectance reflective element.

4. The interior rearview mirror assembly according to claim 3, wherein said reflective element comprises an electro-optic reflective element.

5. The interior rearview mirror assembly of claim 4, wherein said electro-optic reflective element comprises an electrochromic reflective element.

6. The interior rearview mirror assembly of claim 5, wherein said electrochromic reflective element comprises an electrochemichromic reflective element.

7. The interior rearview mirror assembly according to claim 2, wherein said recessed portion is located behind said reflective element.

8. The interior rearview mirror assembly according to claim 2, wherein said casing comprises a plastic casing.

9. The interior rearview mirror assembly according to claim 2, wherein said casing comprises an engineering polymer material.

10. The interior rearview mirror assembly according to claim 2, wherein said recessed portion includes an accessory attachment member for releasably bolding said electrically operated assembly.

11. The interior rearview mirror assembly according to claim 10, wherein said attachment member is integrally molded with said casing.

12. The interior rearview mirror assembly according to claim 2, wherein said casing includes a forward facing side, and said forward facing side includes said recessed portion.

13. The interior rearview mirror assembly according to claim 2, wherein said recessed portion includes an accessory attachment member for securing the electrically operated assembly to said casing.

14. An interior rearview mirror assembly for a vehicle, said mirror assembly comprising:
    a casing;

a reflective element positioned in said casing;

at least one accessory;

said casing including a storage space, said storage space providing storage capacity for said at least one accessory and for storing said at least one accessory in a location accessible by an occupant of the vehicle whereby said at least one accessory can be inserted into or removed from said storage space for use by an occupant of the vehicle; and said accessory comprising a dockable assembly, said dockable assembly being supported in said storage space and being removably mounted to said casing whereby said dockable assembly can be docked in said storage space and an occupant of the vehicle can remove said dockable assembly from said storage space and use said dockable assembly independently of said rearview mirror assembly, said dockable assembly comprising a light assembly, and said light assembly including a housing and a lens, at least one of said lens and said housing being contoured to follow contours of said casing whereby said light assembly forms a unitary part of said casing of said mirror assembly when said light assembly is mounted in said storage space.

15. The interior rearview mirror assembly according to claim 14, wherein said casing includes a pair of recessed portions formed on opposed ends of said casing, each of said recessed portions storing a light assembly.

16. The interior rearview mirror assembly according to claim 14 wherein said housing includes at least one gripping surface.

17. The interior rearview mirror assembly according to claim 16, wherein said gripping surface comprises a recess formed in said housing.

* * * * *

UNITED STATES PATENT AND TRADEMARK OFFICE
CERTIFICATE OF CORRECTION

PATENT NO. : 6,428,172 B1
APPLICATION NO. : 09/449121
DATED : August 6, 2002
INVENTOR(S) : Barry W. Hutzel et al.

Page 1 of 2

It is certified that error appears in the above-identified patent and that said Letters Patent is hereby corrected as shown below:

In the Specifications:

Column 4:
Line 35, Fig. 19, insert --of-- before "Fig. 1"
Line 63, Fig. 27, "." should be --;-- after "26"

Column 5:
Line 16, Fig. 33, insert --of-- before "Figs. 9-14"

Column 6:
Line 63, delete "and" before "now U.S. Pat. No. 6,278,377"

Column 9:
Line 30, insert --.-- after "status"

Column 22:
Line 9, "enbodiment" should be --embodiments--
Line 12, insert --.-- after "width"

Column 37:
Line 5, "AID";" should be --AID",-- in the first occurrence
Line 9, "sensor";" should be --sensor",-- in the first occurrence In the Claims:

Column 37:
Line 37, Claim 1, "header," should be --header;--

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 6,428,172 B1

Column 38:
Line 1, Claim 2, "nurror" should be --mirror--
Line 4, Claim 2, "header," should be --header;--
Line 52, Claim 10, "bolding" should be --holding--